(12) United States Patent
Hirayama et al.

(10) Patent No.: US 7,673,921 B2
(45) Date of Patent: Mar. 9, 2010

(54) TONNEAU COVER DEVICE OF VEHICLE

(75) Inventors: Isao Hirayama, Hiroshima (JP); Noriaki Haba, Hiroshima (JP)

(73) Assignee: Mazda Motor Corporation (JP)

( * ) Notice: Subject to any disclaimer, the term of this patent is extended or adjusted under 35 U.S.C. 154(b) by 161 days.

(21) Appl. No.: 11/964,109

(22) Filed: Dec. 26, 2007

(65) Prior Publication Data

US 2008/0277957 A1 Nov. 13, 2008

(30) Foreign Application Priority Data

Jan. 24, 2007 (JP) ............................. 2007-013257
Jan. 26, 2007 (JP) ............................. 2007-016096

(51) Int. Cl.
*B60R 5/04* (2006.01)
(52) U.S. Cl. ................ 296/37.16; 296/100.15
(58) Field of Classification Search ............... 296/37.1, 296/37.16, 37.5, 100.15, 100.16, 98
See application file for complete search history.

(56) References Cited

U.S. PATENT DOCUMENTS

| 3,181,911 | A | | 5/1965 | Peras |
| 4,222,600 | A | * | 9/1980 | Cripps et al. ............... 296/37.1 |
| 4,728,141 | A | * | 3/1988 | Motozawa et al. ....... 296/37.16 |
| 7,240,944 | B2 | * | 7/2007 | Plettrichs et al. ......... 296/37.16 |

FOREIGN PATENT DOCUMENTS

| EP | 0524397 A1 | 1/1993 |
| EP | 1084907 A2 | 3/2001 |
| EP | 1084907 A3 | 11/2001 |
| EP | 1813475 A1 | 8/2007 |

OTHER PUBLICATIONS

European Search Report for 08000781.8 issued Apr. 4, 2007.
Official Action for corresponding European Patent Application No. 08000781.8.

\* cited by examiner

*Primary Examiner*—Dennis H Pedder
*Assistant Examiner*—Pinel E Romain
(74) *Attorney, Agent, or Firm*—Studebaker & Brackett PC; Donald R. Studebaker

(57) ABSTRACT

A tonneau cover device comprises a front tonneau cover that is comprised of boards and provided on a front side of a vehicle body, a rear tonneau cover that is comprised of a rollable type of member and provided on a rear side of the vehicle body, and a slide mechanism that moves a rear end of the front tonneau cover and a front end of the rear tonneau cover substantially vertically. Accordingly, there can be provided the tonneau cover device of a vehicle, which is provided so as to extend substantially horizontally above the baggage compartment at the vehicle-body rear portion, which can pull the tonneau cover upward according to the opening-closing movement of the back door, facilitate loading of baggage when the back door is opened, and improve appearances of the back door.

22 Claims, 25 Drawing Sheets

Vehicle Forward

Vehicle Forward ←

TONNEAU COVER DEVICE OF VEHICLE

BACKGROUND OF THE INVENTION

The present invention relates to a tonneau cover device of a vehicle that is provided so as to extend substantially horizontally above a baggage compartment at a vehicle-body rear portion.

Conventionally, it is known that a vehicle, such as a station wagon, which has a back door at a vehicle-body rear portion and in which an space for the baggage compartment is formed in front of the back door, is equipped with a tonneau cover device that is provided so as to extend substantially horizontally above the baggage compartment in order to prevent a baggage or something in the baggage compartment from being recognized from the outside of the vehicle. Herein, if the tonneau cover device remains in its position above the baggage compartment even when the back door is opened, loading of baggage or something through an opening portion formed by the back door opened may not be easy.

Then, the tonneau cover device disclosed in U.S. Pat. No. 3,181,911, in which the tonneau board is coupled to the back door via a linkage member or the like and the rear end of the tonneau board is pulled upward according to the opening movement of the back door, is known.

The above-described tonneau cover device enlarges the opening portion formed behind the tonneau board according to the opening movement of the back door, so that the loading of baggage or something can be made easier and the facility of baggage compartment can be improved.

Meanwhile, the baggage compartment at the vehicle-body rear portion is generally designed in such a manner that the width of its upper side in a vehicle width direction becomes gradually smaller from a vehicle-exterior-design perspective. Accordingly, the tonneau board disclosed in the above patent publication is configured such that only its center part is pulled upward, leaving its both-side parts in their positions, in order to prevent any interference of the side face of the board with the vehicle body such as the side windows.

Nevertheless, it may be preferable that an entire width-direction part of the tonneau board be pulled upward from the point of view of full utility.

Therefore, it can be considered, for example, that a pair of guide rails is provided at rear pillars or the like of the baggage-compartment side portions so as to extend obliquely relative to a vertical direction, both-side portions of the tonneau board are supported at the guide rails, and the tonneau board is guided so as to move upward along the guide rails. This constitution may allow to pull the entire width-direction part of the tonneau board upward, without any interference of the side face of the board with the vehicle body such as the side windows, because any outward (rearward) projecting movement of the tonneau board is not caused.

The above-described constitution, however, provides a concern that a rear part of the tonneau board that is located behind the guide rails may interfere with a rear header or something that are disposed behind the baggage compartment because that part of the tonneau board is pulled upward together with other parts of the tonneau board. Therefore, it may be considered that the above-described rear part of the tonneau board is configured to be separate from the other parts of the tonneau board and fixed to the inside face of the back door.

Herein, if a relatively hard tonneau board is fixed to the inside face of the back door, there is a concern that a head of an operator may interfere with the tonneau board projecting downward when the back door is opened and thereby the loading of baggage may not be easily conducted. Further, if the tonneau board is fixed to the inside face of the back door, that fixed tonneau board projects downward from the back door opened. This may cause some deterioration of appearances.

SUMMARY OF THE INVENTION

An object of the present invention is to provide a tonneau cover device of a vehicle, which is provided so as to extend substantially horizontally above a baggage compartment at a vehicle-body rear portion, which can pull a tonneau cover upward according to an opening-closing movement of the back door, facilitate loading of baggage when the back door is opened, and improve appearances of the back door.

According to the present invention, there is provided a tonneau cover device of a vehicle, which is provided so as to extend substantially horizontally above a baggage-compartment floor at a vehicle-body rear portion that is equipped with a back door to open and close a vehicle-body opening portion formed at a vehicle-body rear face and the baggage-compartment floor disposed in front of the vehicle-body opening portion, comprising, a pair of guide rails provided at both-side walls of a baggage compartment so as to extend obliquely relative to a vertical direction, a first tonneau cover provided so as to extend substantially horizontally above the baggage-compartment floor, a rear end of the first tonneau cover being supported at the guide rails, a second tonneau cover provided at a rear end of the first tonneau cover, a rear end portion of the second tonneau cover being coupled to the back door, the second tonneau cover having a rollable type of sheet member, and a slide drive mechanism operative to move substantially vertically the rear end of the first tonneau cover and a front end of the second tonneau cover along the guide rails.

According to the above constitution, since the slide drive mechanism moves vertically the rear end of the first tonneau cover and the front end of the second tonneau cover along the guide rails, the rear end of the first tonneau cover and the front end of the second tonneau cover move obliquely beside the both-side walls of the baggage compartment according to the opening-closing movement of the back door. Thereby, the first tonneau cover does not project outward (rearward) from the baggage compartment, so it does not interfere with the side windows of the baggage-compartment side faces. Further, the second tonneau cover is comprised of the rollable type of sheet member, and the second tonneau cover is withdrawn out in such a manner that it follows the rear end of the first tonneau cover when the door back is opened. Thereby, the tonneau cover can be located further forward compared to a case where the tonneau cover is comprised of a board member that is fixed to the back door. Accordingly, the second tonneau cover can be located forward, not projecting downward, when the back door is open. Thereby, any interference of the head of the operator with the tonneau cover can be avoided at the loading of baggage. Further, even if there occurred slight interference, the sheet member is flexible and therefore such interference may not hurt the operator. Also, since the back door has no tonneau cover projecting downward, the appearances of the back door opened can be improved. The first tonneau cover may be comprised of any type of member.

According to an embodiment of the present invention, the first tonneau cover is comprised of a board member. Thereby, the baggage compartment is covered with the first tonneau cover of the board member having a proper rigidity. Accordingly, appearances of the baggage compartment can be improved with a state in which the first tonneau cover extends over the baggage compartment. Further, the first tonneau cover can be used as a member on which some object is placed. Thus, functionality of the tonneau cover can be further improved, keeping good appearances of the baggage compartment, with the tonneau cover device extending over.

According to another embodiment of the present invention, the sheet member of the second tonneau cover has a side cut-away portion that is operative to prevent interference with a periphery of the vehicle-body opening portion formed at the vehicle-body rear face when the back door is open. Since the side cut-away portion is provided at the sheet member of the second tonneau cover, any interference of the sheet member withdrawn out at the opening of the back door with the periphery of the vehicle-body opening portion can be avoided. Accordingly, the periphery of the vehicle-body opening portion may not be hurt by the sheet member withdrawn out. Further, since the sheet member withdrawn out has no contact with the periphery of the vehicle-body opening portion, the operation of the second tonneau cover may not be interrupted, thereby proving its smooth withdrawing. Thus, even if the rear tonneau cover is comprised of the rollable type of sheet member and configured to be withdrawn out at the opening of the back door, the periphery of the vehicle-body opening portion may not be hurt by the sheet member withdrawn out and its withdrawing operation can be conducted smoothly.

According to another embodiment of the present invention, the sheet member of the second tonneau cover has a transparent portion. Thereby, the proper forward or rearward visibility through the transparent portion can be obtained even when the sheet member extends substantially vertically in a screen state between a vehicle compartment and the vehicle rear portion at the opening of the back door. Accordingly, the operator may have necessary communications with a passenger in the vehicle compartment when loading the baggage, and the passenger in the vehicle compartment can also recognize the operator behind as well. Thus, exchanging of information through the sheet member of the second tonneau cover extending at the opening of the back door can be facilitated, and the safety can be improved. Herein, the transparent portion may be formed at a specified portion of the sheet member extending at the opening of the back door, not necessarily at an entire part of the sheet member. And, this transparent portion can be comprised of a mesh, a through hole a slit or the like, or may be configured by applying the sheet member which is made of a transparent material or a semi-transparent one.

According to another embodiment of the present invention, the first tonneau cover is comprised of a plurality of board members that are disposed in a vehicle longitudinal direction, and the first tonneau cover is configured to bend between adjacent board members at a vertical movement thereof along the guide rails. Thereby, since the first tonneau cover bends between the adjacent board members at the upward moving of the first tonneau cover, the rear end of the first tonneau cover moves forward and thus a rear opening portion formed behind the first tonneau cover enlarges. Accordingly, even if the first tonneau cover is comprised of the board members, the rear opening portion formed behind the first tonneau cover can be enlarged by bending the board members.

According to another embodiment of the present invention, there is provided a guide means to cause a specified bending between the adjacent board members. Thereby, the guide means causes the specified bending between the adjacent board members when the board members move vertically along the guide rails. Thus, whenever the board members move vertically, the specified bending of the board members can be surely generated by the guide means. Herein, the guide means may be provided at the side of the vehicle body or at the side of board members.

According to another embodiment of the present invention, bending between the adjacent board members is a reverse-V-shaped bending. Thereby, the rear opening portion formed behind the first tonneau cover can be enlarged by bending the adjacent board members in a reverse-V shape. Herein, it may be necessary to position the rear board member at a higher level than the front board member in order to properly obtain the reverse-V-shaped bending. Therefore, the first tonneau cover is located "stepwise" in such a manner that the rear board member is positioned at the higher level, so that appearances of the tonneau cover device in the baggage compartment can be improved. Thus, the first tonneau cover that is configured to properly bend can improve the appearances of the tonneau cover device extending.

According to another embodiment of the present invention, at a side face of the baggage compartment is provided a guide means operative to cause the reverse-V-shape bending between the adjacent board members. Thereby, since the guide means is provided, the reverse-V-shaped bending can be properly provided between the adjacent members. Accordingly, the reverse-V-shaped bending of the board members can be provided surely without any particular mechanism provided at the first tonneau cover itself for that. Thus, the structure of the first tonneau cover can be made simple, and the first tonneau cover can be manufactured lightly and inexpensively.

According to another embodiment of the present invention, the guide means comprises a support portion to support the adjacent board members in a reverse-V-shaped bending state. Thereby, by supporting the adjacent board members in the reverse-V-shaped bending state by the support portion of the guide means, the reverse-V-shaped bending can be generated between the adjacent board members when the board members move vertically. Thus, the reverse-V-shaped bending can be surely generated without providing any particular mechanism at the board member itself. Accordingly, the structure of the board members can be made simple, so the weight reduction and manufacturing cost reduction can be achieved.

According to another embodiment of the present invention, the rear end of the first tonneau cover is supported at the guide rails at a position that is below a plan extending line of a front board member of the adjacent board members. Thereby, since the support position of the rear end of the first tonneau cover at the guide rails is located below the plan extending line of the front board member of the adjacent board members, this support position may become a point for pushing up the front board member, thereby properly causing the reverse-V-shaped bending to the first tonneau cover. This is because the above-described location of the support position may generate a situation in which a dynamically imaginary board member is provided on a straight line that interconnects the rear end of the front board member and the support position at the guide rails. As a result, the imaginary board member and front board member may take positions where these have been bent in the reverse-V shape, so that as the support position is moved forward, the front board member is pushed upward further so as to increase the reverse-V-shaped bending. Thus, the reverse-V-shaped bending can be generated surely at the board members of the first tonneau cover.

According to another embodiment of the present invention, at least one board member is provided in front of the adjacent board members. Thereby, a wider area above the baggage compartment is covered with the board members. Thus, the wider area above the baggage compartment can be covered by providing the additional board member to the adjacent board members, enlarging the rear opening portion behind the first tonneau cover.

According to another embodiment of the present invention, rear-side adjacent board members are configured to bend in a first direction and front-side adjacent board members are configured to bend in a second direction when the board members move vertically along the guide rails. Thereby, since at least two bending points are generated at the board members, a bending angle, a size or a shape of bending boards, or the like can be set freely. Thus, the design flexibility of the board members can be increased, ensuring the bending of board members. Herein, the above-described first and second directions may be different from one another or the same.

According to another embodiment of the present invention, at least one board member is further provided in front of the three board members. Thereby, much wider area above the baggage compartment can be covered with the board members. Thus, the opening portion behind the board members can be enlarged with the increased flexibility of the bending, properly covering the wider area above the baggage compartment.

According to another embodiment of the present invention, the first and second tonneau covers are provided detachably at a vehicle body. Thereby, these first and second tonneau covers can be removed away from the upper portion of the baggage compartment when they are not necessary. Thus, the baggage-compartment space at the vehicle rear portion can be used widely when the tonneau covers are unnecessary, thereby enlarging the space for the baggage compartment.

According to another embodiment of the present invention, a foremost board member of the first tonneau cover has a fixing portion to the vehicle body. Thereby, the board member in the foremost position is always fixed to the vehicle body. Accordingly, the position of the foremost board member, which may not concern the enlargement of the opening of the tonneau cover device, i.e., the first tonneau cover, can be surely fixed. Thus, the bending point of the first tonneau cover is fixed surely, so the bending movement of the first tonneau cover can be surely provided, allowing the first tonneau cover and the like to be detachable.

According to another embodiment of the present invention, the first and second tonneau covers are configured to be foldable. Thereby, the tonneau cover device, which extends widely, can be folded compactly when they are removed from the vehicle body. Thus, the removed first and second tonneau covers can be compactly stored in the baggage compartment or the like, which may improve the facility of the tonneau cover device.

According to another embodiment of the present invention, the first tonneau cover is comprised of a rollable type of sheet member. Thereby, since both the first and second tonneau covers are formed without a board member, the tonneau cover device can be made properly compact when they are removed. Thus, the removed first and second tonneau covers can be further compactly stored in the baggage compartment or, which may further improve the facility of the tonneau cover device.

According to another embodiment of the present invention, the slide drive mechanism is configured to move vertically the rear end of the first tonneau cover and the front end of the second tonneau cover according to an opening-closing movement of the back door. Thereby, whenever the back door opens or closes, the rear end of the first tonneau cover and the front end of the second tonneau cover are moved vertically. Accordingly, since the opening portion behind the tonneau cover device can be enlarged just by opening the back door, the facility at the loading of the baggage into the baggage compartment or the unloading it from the baggage compartment can be improved. Thus, the operator can conduct the baggage loading/unloading easily without directly operating the tonneau cover device.

According to another embodiment of the present invention, the slide drive mechanism comprises a wire member, one end of which is fixed to the back door and the other end of which is fixed to the rear end of the first tonneau cover. Thereby, the tonneau cover device can be opened or closed mechanically by utilizing the opening/closing movement of the back door itself. Thus, the opening/closing movements of the back door and the tonneau cover device can be mechanically linked with a simple structure of the wire member, so the reduction of the manufacturing cost reduction can be achieved.

According to another embodiment of the present invention, the slide drive mechanism comprises an electromotive mechanism. Thereby, the tonneau cover device can be opened or closed regardless of the opening/closing movement of the back door. Further, the speed of the opening/closing movement of the tonneau cover device is not restricted by the speed of the opening/closing movement of the back door. Thus, the tonneau cover device can be operated freely regardless of the state or speed of the opening/closing movement of the back door.

Other features, aspects, and advantages of the present invention will become apparent from the following description which refers to the accompanying drawings.

DETAILED DESCRIPTION OF THE INVENTION

Hereinafter, preferred embodiments of the present invention will be descried referring to the accompanying drawings. It should be understood that even though embodiments are separately described, single features thereof may be combined to additional embodiments.

Embodiment 1

Figure 1:
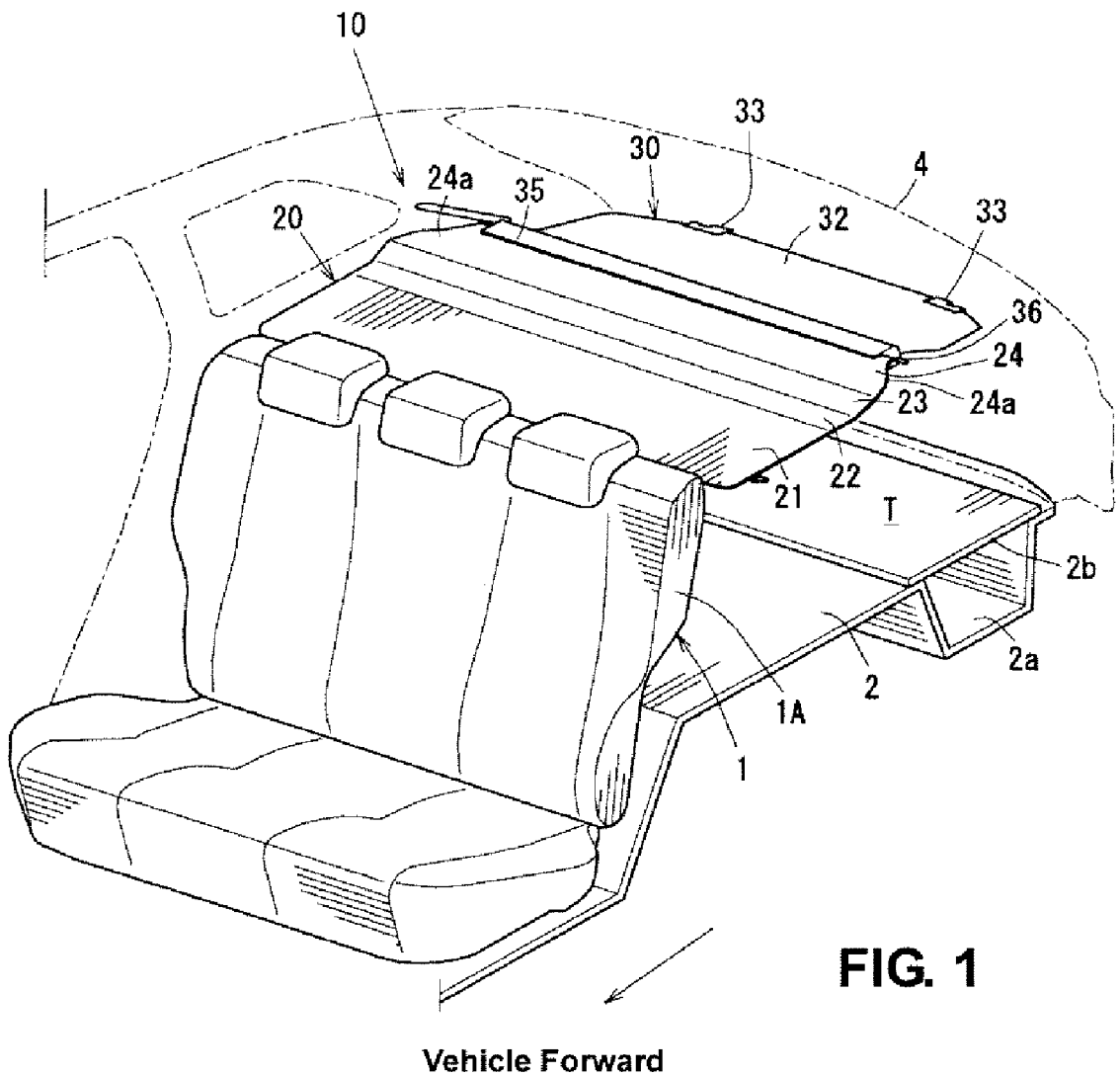
FIG. 1 is a perspective view of a baggage compartment equipped with a tonneau cover device according to a first embodiment, when viewed from the top.
Figure 2:
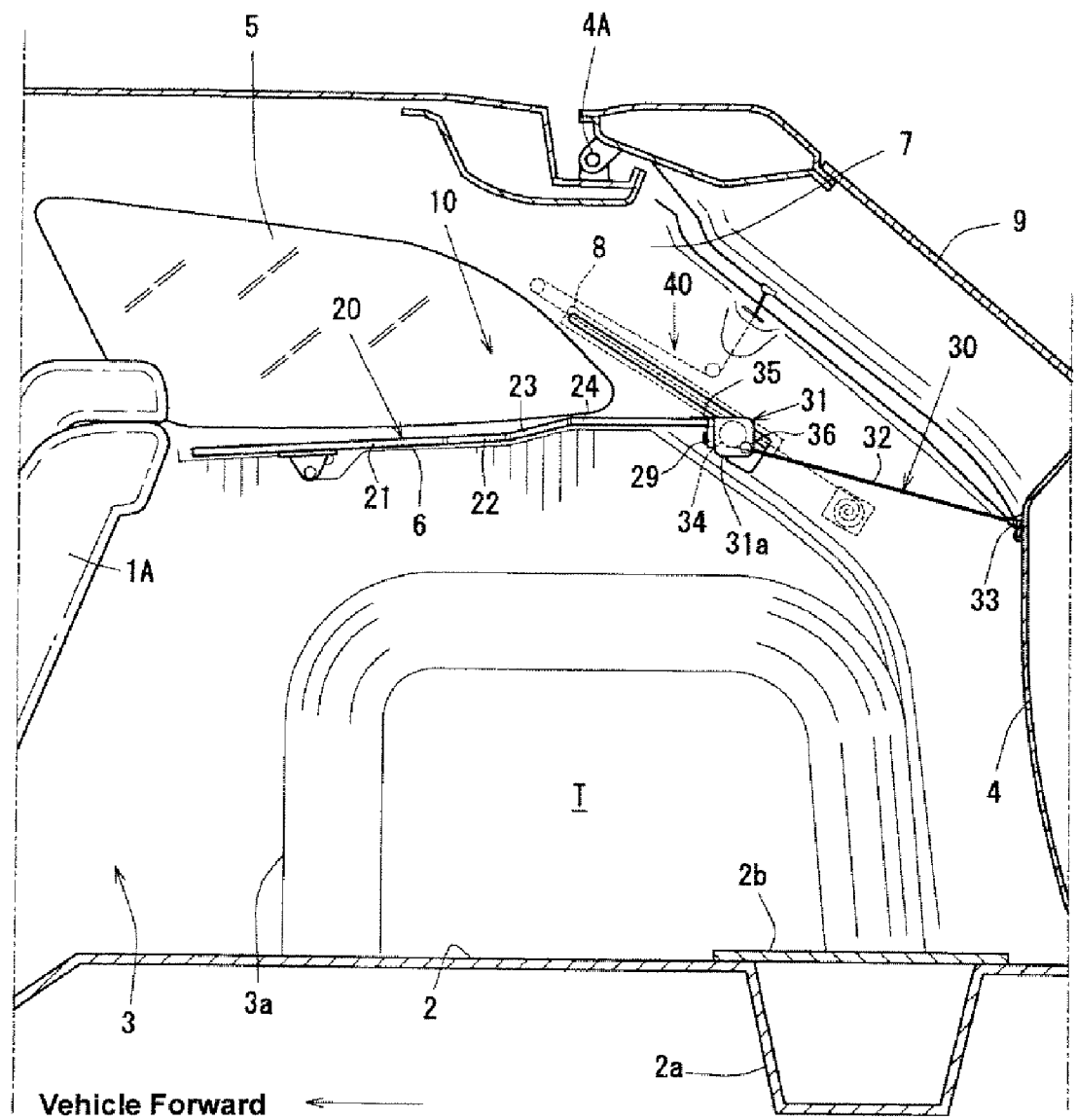
FIG. 2 is a side view of the baggage compartment with the tonneau cover device.
Figure 3:
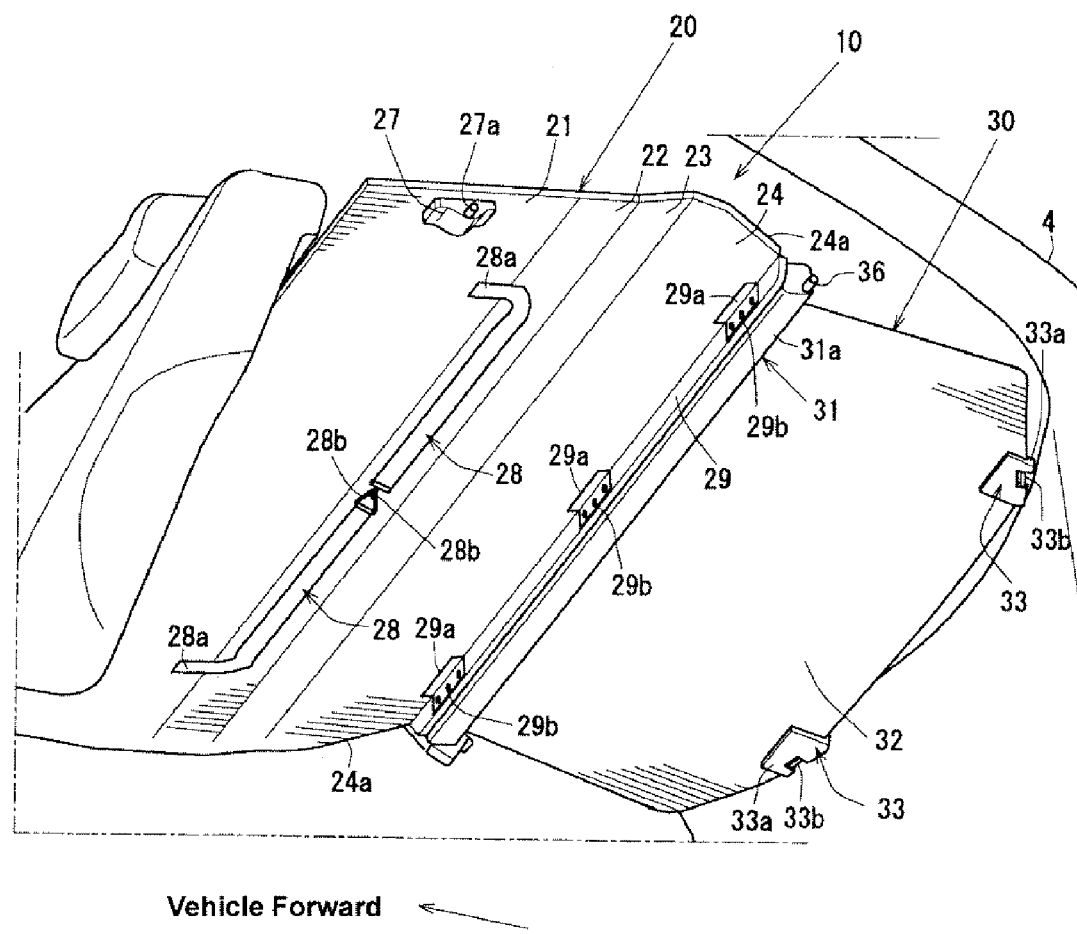
FIG. 3 is a perspective view of the baggage compartment with the tonneau cover device, when viewed from the bottom.

FIG. 1 is a perspective view of a baggage compartment equipped with a tonneau cover device according to a first embodiment, when viewed from the top. FIG. 2 is a side view of the baggage compartment with the tonneau cover device. FIG. 3 is a perspective view of the baggage compartment with the tonneau cover device, when viewed from the bottom.

A baggage compartment T of the vehicle according to the present embodiment is provided behind a rear seat 1 of a rear portion of a vehicle body (vehicle-body rear portion) as shown in FIG. 1. The baggage compartment T is comprised of a space that is enclosed by a rear floor panel 2 that constitutes a baggage-compartment floor, a seat back 1A of the rear seat 1, side panels 3 that are provided side portions of the vehicle body (see FIG. 2), a back door 4 that is provided at the rear portion of the vehicle body, and the like.

The rear floor panel 2 is provided so as to extend substantially horizontally at the rear portion of the vehicle body, with its upper face for some baggage placed thereon. The panel 2 has a sub trunk portion 2a at its rear portion, which is formed so as to be recessed downward and extend in a vehicle width direction. A trunk board 2b covers over the sub trunk portion 2a.

The seat back 1A stands in an upright position, extending in the vehicle width direction. The seat back 1A partitions the baggage compartment from a vehicle compartment (passenger compartment).

The side panels 3 are provided at the side portions of the vehicle body so as to extend substantially vertically and in a longitudinal direction of the vehicle body as shown in FIG. 2. Each side panel 3 includes a wheel house 3a that protrudes toward the inside of the baggage compartment at its lower part and a quarter window glass 5 at its upper part.

Below the quarter window glass 5 is provided a shelf portion 6 that is a supporting portion to support a tonneau cover device 10, which will be described below, so as to extend in the longitudinal direction of the vehicle body. The shelf portion 6 determines the height of the tonneau cover device 10 positioned in the baggage compartment T.

A rear pillar 7 is provided behind each of the quarter window glass 5 so as to extend obliquely relative to the vertically direction as shown. A slide rail 8, which will be described below, is provided on an inside of each of the rear pillars 7.

Figure 4:
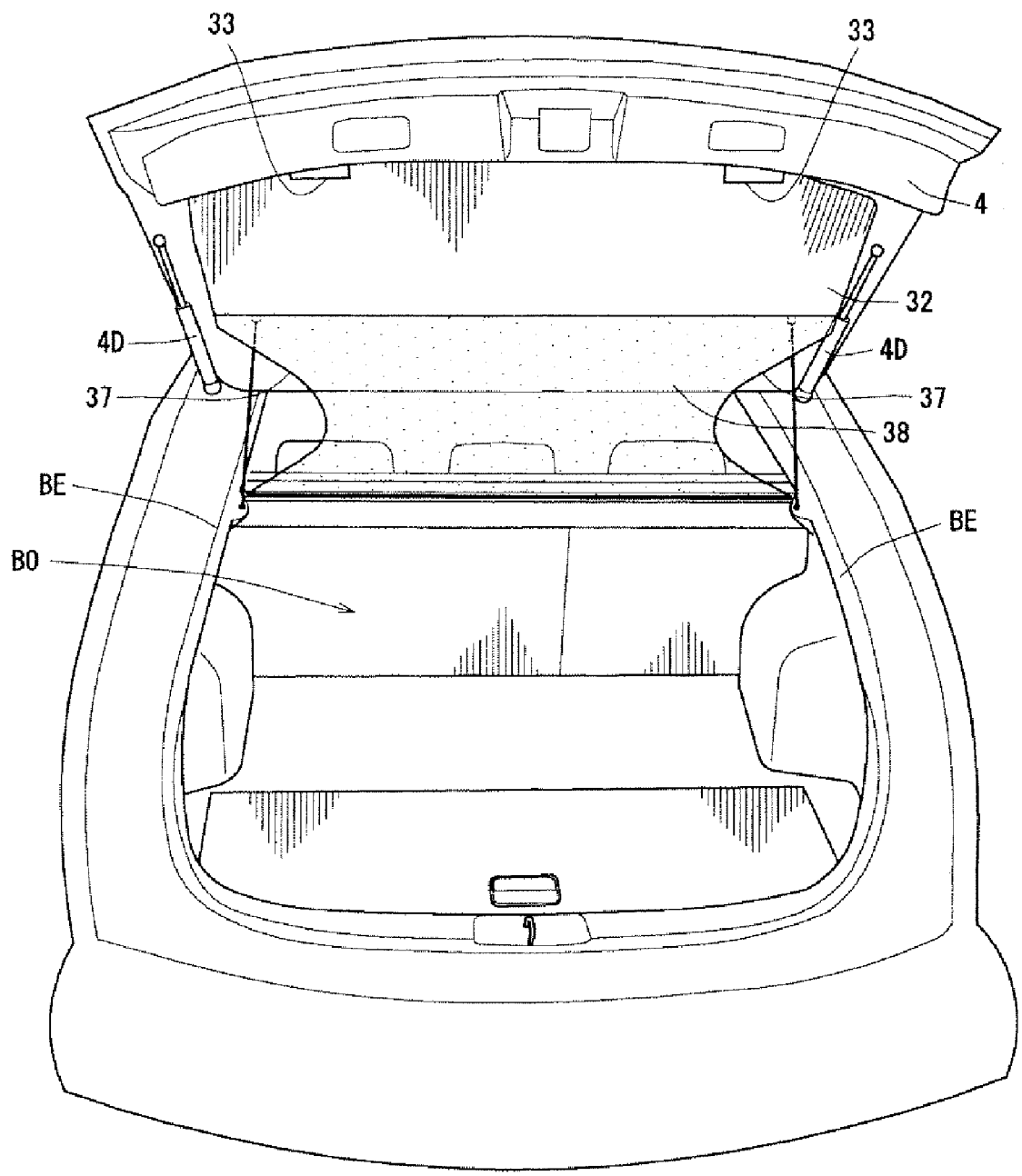
FIG. 4 is a back view of a vehicle with a back door opened.

The back door 4 is attached pivotally at an upper end of the rear portion of the vehicle body via a rotational hinge 4A at its upper end so as to open or close an opening portion BO of the rear portion of the vehicle body (see FIG. 4). The back door 4 has a back window glass 9 for a rear view at its upper part.

The tonneau cover device 10 is provided so as to extent substantially horizontally in the baggage compartment that is configured as described above. The tonneau cover device 10 is placed over the baggage compartment so as to prevent the baggage in the baggage compartment T from being observed (seen) from the outside.

The tonneau cover device 10 comprises a board type of front tonneau cover 20, a rollable type of rear tonneau cover 30, and a slide mechanism 40 that is operative to move a rear end of the front tonneau cover 20 and a front end of the rear tonneau cover 30 substantially vertically.

The board type of front tonneau cover 20 is comprised of a plurality of board members 21, 22, 23, 24 that are made of synthetic resin, complex boards or the like. The first board 21, second board 22, third board 23 and fourth board 24 are disposed in order from the front. Each longitudinal length of the respective board members 21-24 may be set properly according to bending points and the like.

Figure 9:
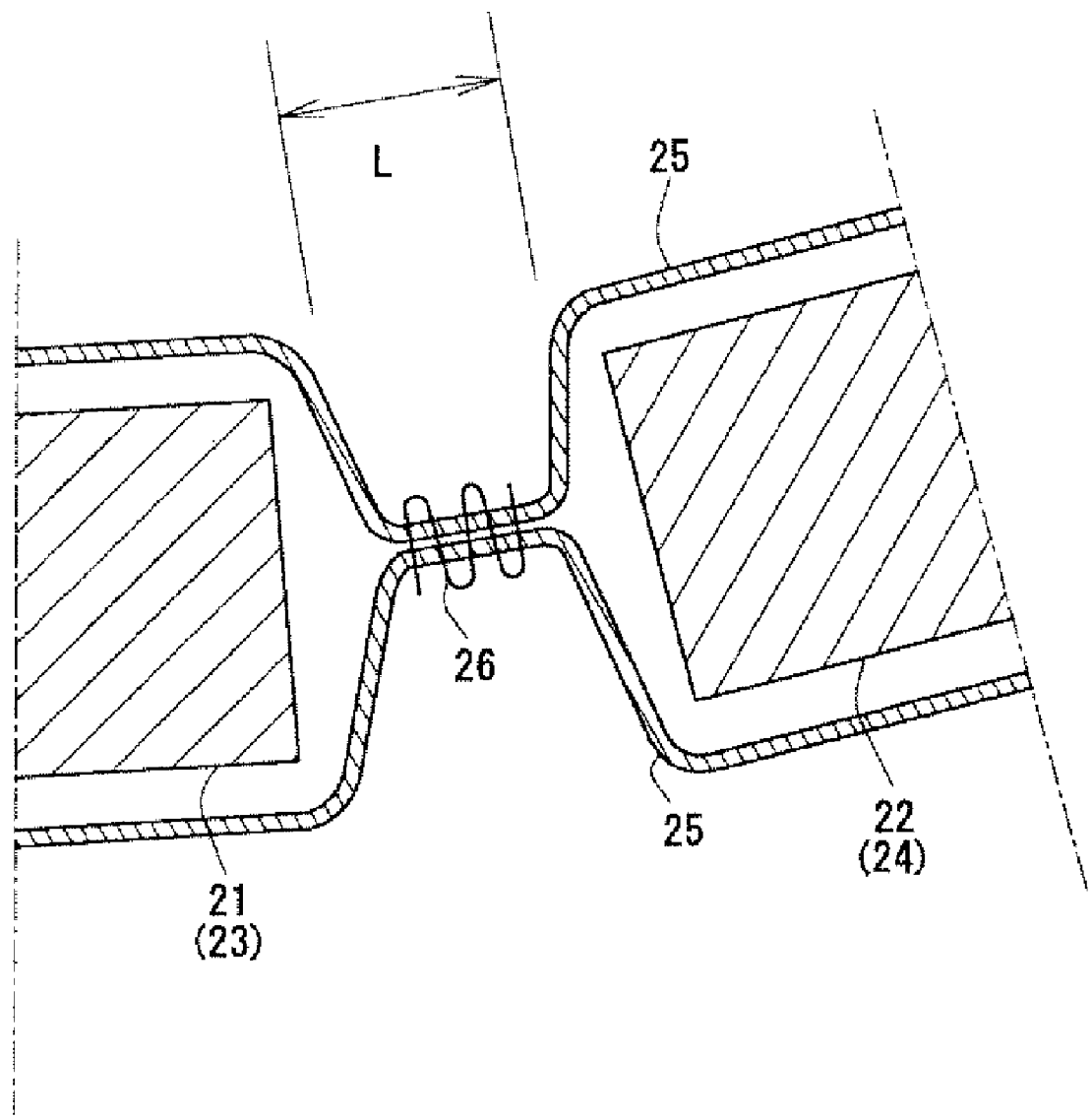
FIG. 9 is a specific sectional view of a front tonneau cover.

The board members 21-24 are covered with a covering material 25 as shown in FIG. 9. Its upper part and lower part of the covering material 25 are sewed by sewing threads 26 or the like, thereby unifying the board members 21-24. A distance L between the respective board members are set so as to be long enough to fold the respective board members 21-24 vertically. Accordingly, these board members 21-24 can be folded in a reverse-V shape (being with its ridgeline that is positioned upward) or in a V shape (bending its ridgeline that is positioned downward).

The first board 21 is comprised of a substantially rectangular plate member that has the longest length. To both-side portions of a bottom face of the first board 21 is fixed a pair of hinge units 27 having hinge pins 27a (only a single unit is shown in FIG. 3).

Figure 7:
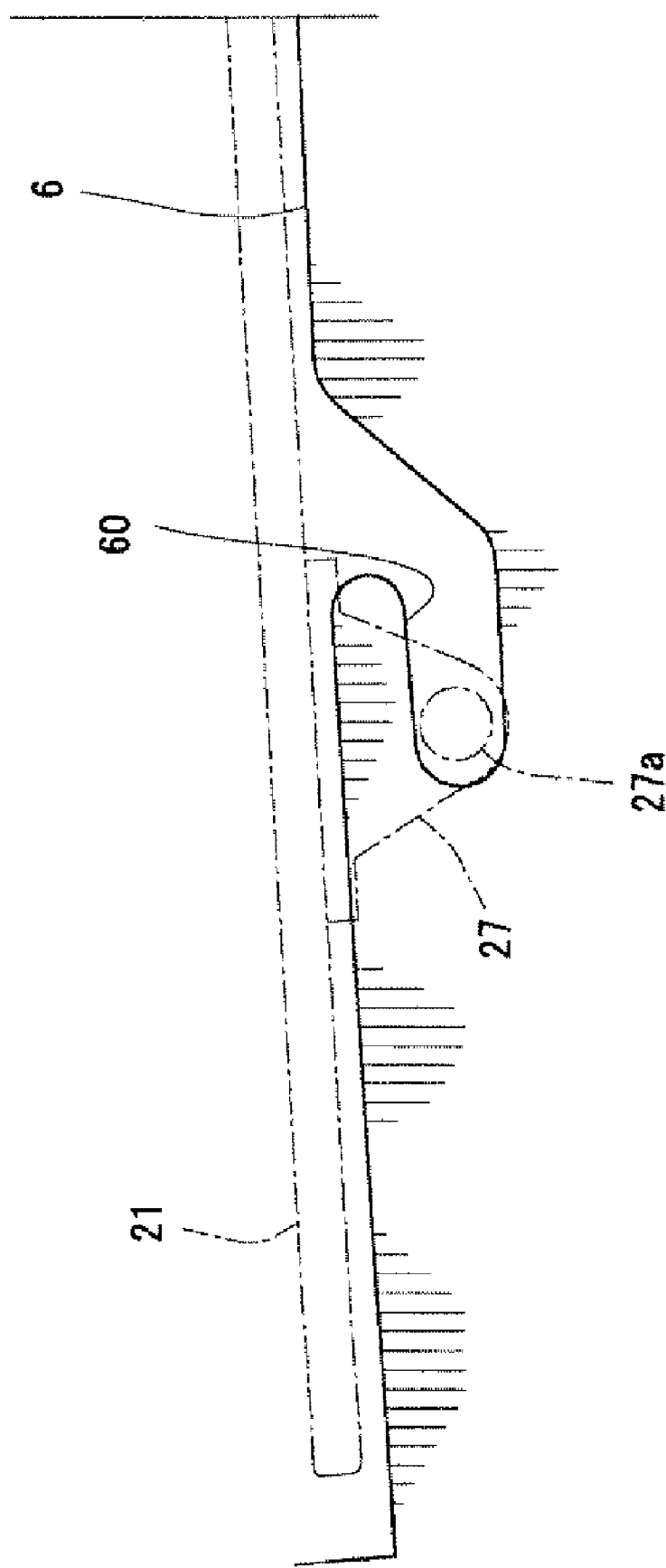
FIG. 7 is a specific view of a holder recess portion that is formed at a shelf portion.

The hinge pin 27a is inserted into a holder recess portion 60 that is formed at the shelf portion 6 as shown in FIG. 7, thereby it can be fixed and held in the holder recess portion. Thus, the position of the tonneau cover device 10 is fixed in the baggage compartment T.

Further, to the bottom face of the first board 21 is provided a pair of fastening bands 28 that is operative to hold the tonneau cover device 10 in its folded state when the device 10 is removed from the vehicle body, as shown in FIG. 3.

One end 28a of one of the bands 28 is fixed to the bottom face of the first board 21 by sewing, and the other end 38b of the other has a metal hook 38b. Both the bands 28 are coupled to one another via hook 28b so as to prevent the bands 28 from hanging down.

Figure 10:
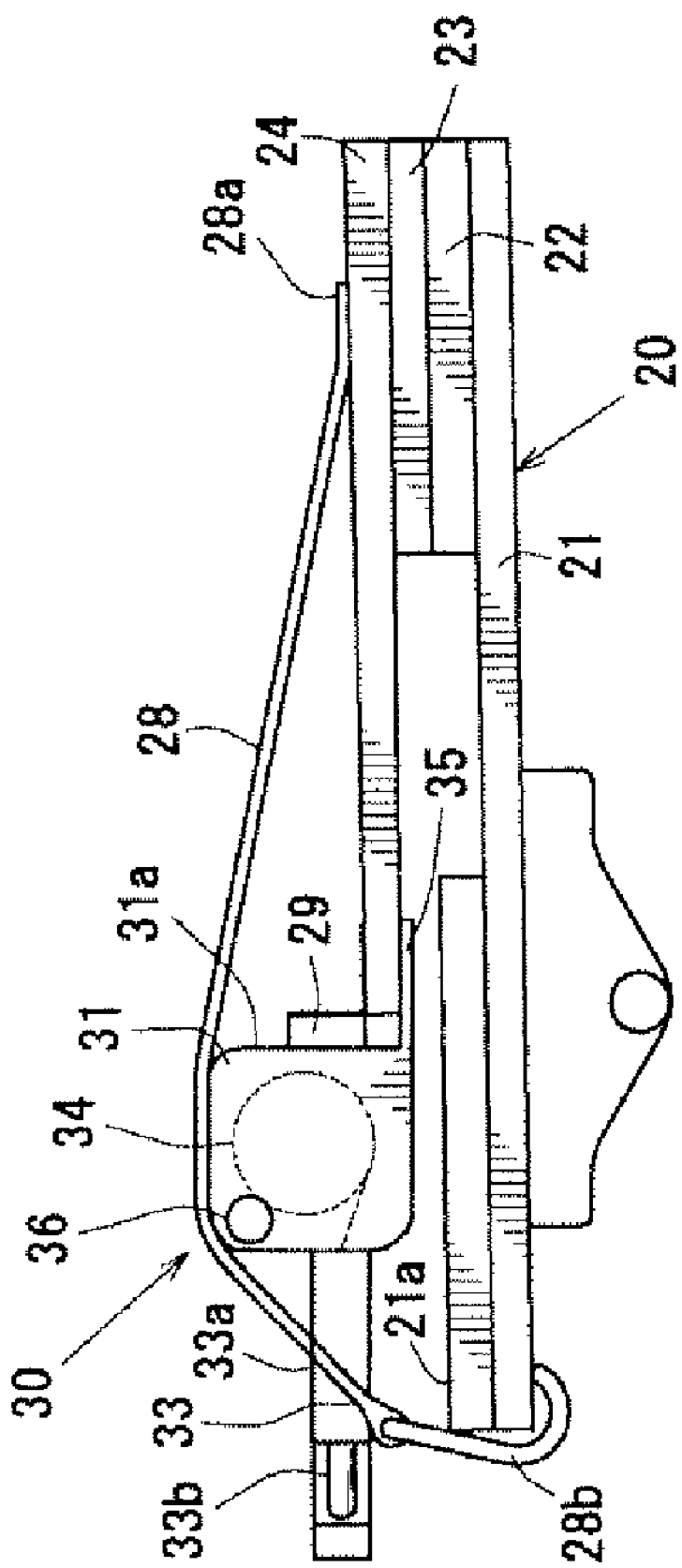
FIG. 10 is a side view of a state in which the front tonneau cover and a rear tonneau cover are folded.

FIG. 10 is a side view of a state in which the front tonneau cover 20 and the rear tonneau cover 30 are folded with the fastening band 28. The front tonneau cover 20 is folded in such a manner that the respective board members 21, 22, 23 and 24 are piled up from the bottom as shown in the figure. Further, a front-end board 21a, which is part of the first board 21, is folded and placed on a front portion of the first board 21. Thus, the folded board members are configure to be properly compact.

Further, a winding-up unit 31 for the rear tonneau cover 30 and the like are fixed to a rear end portion of the fourth board 24. Herein, the hook 28b of the fastening band 28 is operative to engage with the bottom face of the first board 21 as shown, thereby the folded state of the front and rear tonneau covers 20, 30 can be properly held.

Thus, by compactly folding the front tonneau cover 20 and the rear tonneau cover 30, these covers 20, 30 can be stored in the sub trunk portion 2a when they are removed from the baggage compartment T.

Particularly, the distances L between the board members of the tonneau cover device of the present embodiment are configured to be long enough as described above, so any bending in both directions are allowed so as to provide properly free folding.

The second board 22 is disposed behind the first board 21 and comprised of a substantially rectangular plate member with its shorter length than its width. Also, the third board 23 is disposed behind the second board 22 and comprised of a substantially rectangular plate member with its shorter length than its width. These second and third boards 22, 23 are configured to move according to the movement of the fourth board 24 when the tonneau cover device 10 is opened or closed, as described later on.

Further, the fourth board 24 is disposed behind the third board 23 and comprised of a substantially rectangular plate member with its shorter length than its width. Herein, the longitudinal length of the fourth board 24 is longer than the longitudinal length of the third board 23. Both ends 24a of the fourth board 24 are configured to be in a slant shape in such a manner that its rear width becomes shorter, as shown in FIG. 1 and the others.

A fixing board 29 to fix the winding-up unit 31 for the rear tonneau cover 30 is further provided at a rear portion of the fourth board 24. The fixing board 29 is connected to a bottom face of the rear end of the fourth board 24 via three connecting sheets 29a so as to rotate freely relative to the fourth board 24, as shown in FIG. 3.

Further, the fixing aboard 29 firmly fix the winding-up unit 31 extending in the vehicle width direction via fixing bolts 29b, which functions as a connecting member between the front tonneau cover 20 and the rear tonneau cover 30.

Meanwhile, the rear tonneau cover 30 has the winding-up unit 31 fixed to the fixing board 29, a sheet member 32 that is withdrawn out from the wining-up unit 31, and an engagement handle portion 33 that is fixed to a tip (rear end) of the sheet member 32.

The winding-up unit 31 comprises a casing 31a that is formed so as to extend in the vehicle width direction and a winding-up roller 34 that is provided therein to wind up the sheet member 32. The winding-up roller 34 comprises a biasing member (not shown) operative to withdraw the sheet member 32 in a winding-up direction.

At an upper end of the front portion of the winding-up unit 31 is provided an engagement piece portion 35 (see FIG. 10) to engage with the fourth board 24 so as to move together with the fourth board 24 when the tonneau cover device 10 is opened. Also, at both-side end portions of the winding-up unit 31 are provided engagement boss portions 36 that extend laterally and are supported at slider members, which will be described later.

The sheet member 32 is comprised of a sheet material of synthetic lather or cloth, and configured to be withdrawn out of an outlet (not illustrated), which is formed so as to extend in the vehicle width direction, toward the rear of the vehicle body.

The sheet member 32, which is pulled out to a certain extent as shown in FIG. 2, covers over the rear portion of the baggage compartment T. When it disengages with the back door 4, the sheet member 32 is withdrawn into the winding-up unit 31. When the back door 4 is opened, the sheet member 32 is withdrawn fully upward according to the opening of the back door 4.

FIG. 4 is a back view of the vehicle with the back door 4 that is opened. As shown here, when the back door 4 is opened, the sheet member 32 fixed to the inside face of the back door 4 is withdrawn rearward and extends substantially vertically in a screen shape between the upper portion of the baggage compartment T and the rear portion of the vehicle body.

The sheet member 32 has substantially semicircular side cut-away (recess) portions 37, 37 at the both sides. These side cut-away portions 37, 37 are operative to prevent interference with side peripheries BE of the opening portion BO at the vehicle-body rear portion when the sheet member 32 extends in the screen shape.

The sheet member 32 has a transparent mesh portion 38 at its base-end side portion (lower portion in the figure). This mesh portion 38 is provided to give a proper forward or rearward visibility through it when the sheet member 32 extends in the screen state.

The engagement handle portions 33 are provided, as shown in FIG. 3, at the rear end of the sheet member 32 at both sides, which comprise substantially pentagonal bases 33a and pins 33b provided in the bases 33a.

Figure 8:
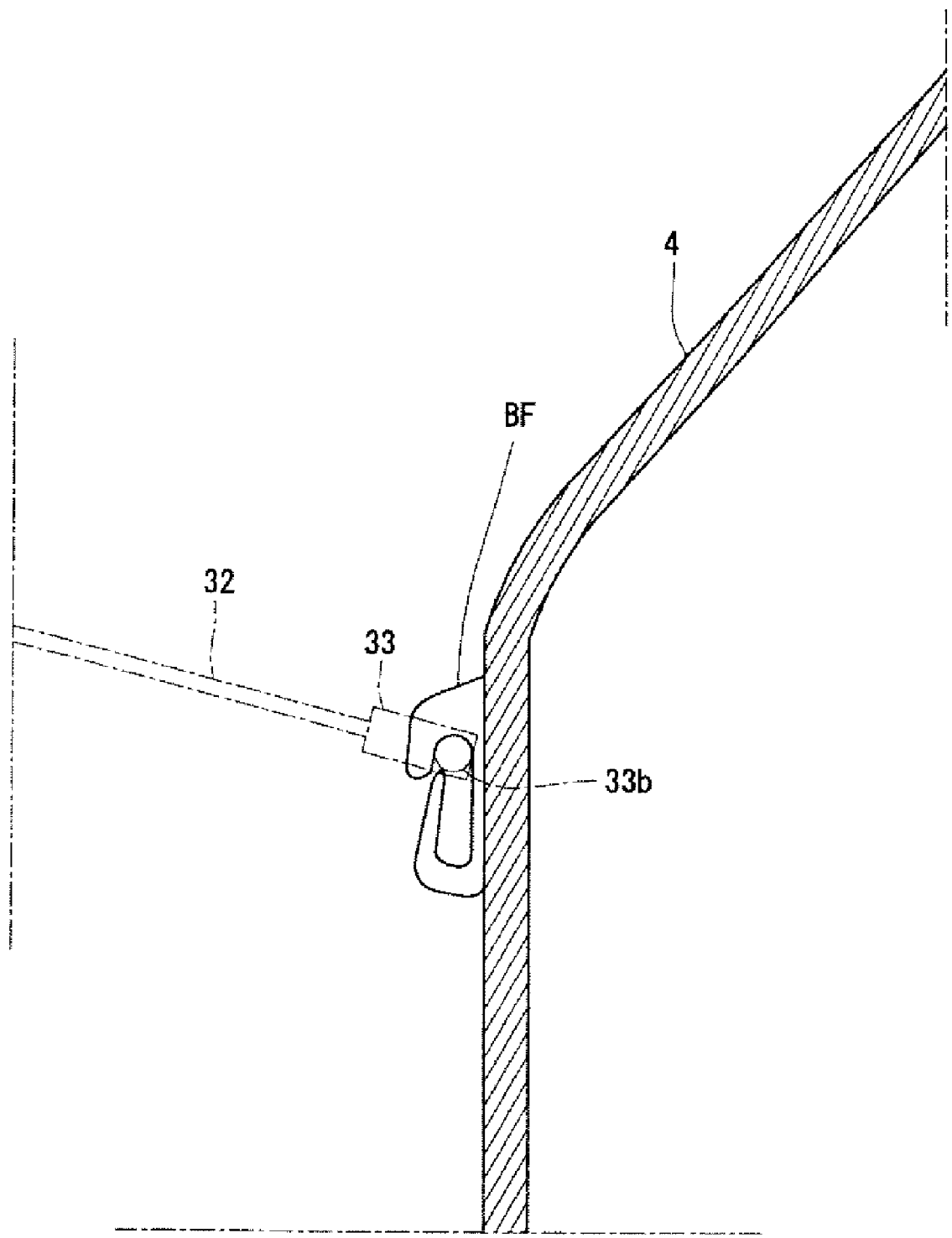
FIG. 8 is a specific view of an engagement hook of the back door.

The pin 33b of the engagement handle portion 33 is engaged with an engagement hook BF provided at the back door 4 as shown in FIG. 8, thereby fixing the handle portion 33 to the back door 4. Thus, the sheet member 32 of the rear tonneau cover 30 can be fixed to the back door 4 via the engagement handle portion 33 so as to move according to the opening/closing movement of the back door 4. Herein, when the sheet member 32 needs to be stored in the winding-up unit 31, the pin 33b is detached from the engagement hook BF.

Figure 5:
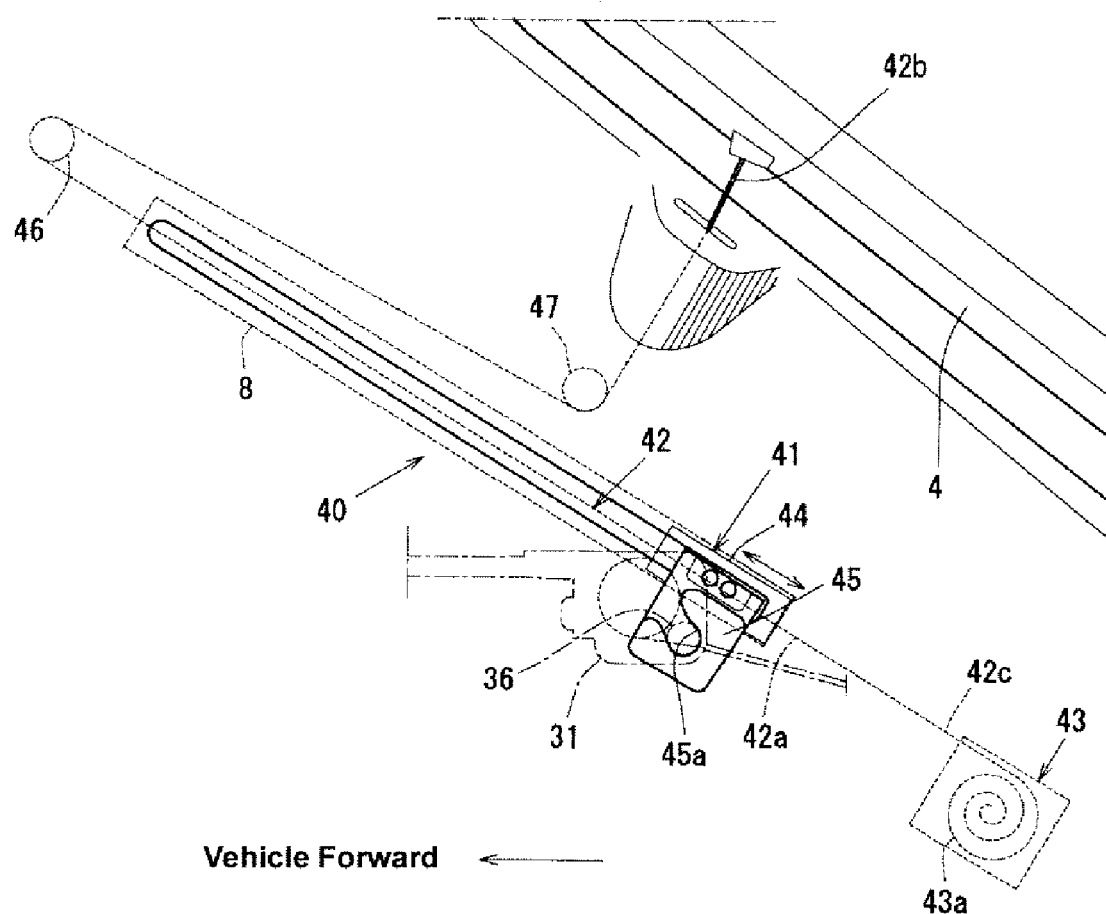
FIG. 5 is a specific side view of surrounding of a slide mechanism.

The slide mechanism 40 comprises, as shown in FIG. 5, the slide rails 8, slider members 41 that moves vertically along the slide rails 8, wire members 42 that are move the slider members 41 vertically, and biasing means 43 that are provided at the lower portion of the slide rails 8 for giving a biasing force to the wire members 42. Only one side of members of the slide mechanism 40 are illustrated in the drawings.

Figure 6:
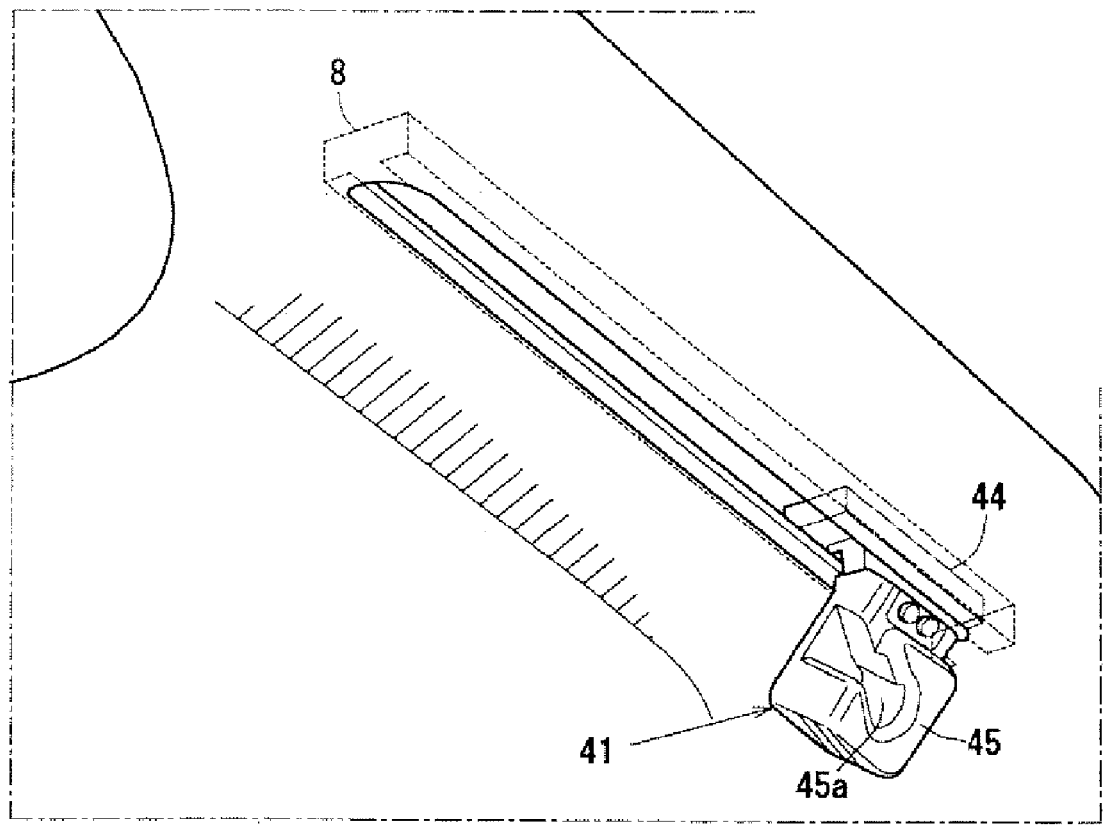
FIG. 6 is a specific perspective view of surrounding of the slide mechanism.

The slide rail 8 is comprised of a groove-shaped steel member having a C-shaped section with an inside open end, as shown in FIG. 6. The slide rail 8 is provided so as to extend obliquely with a specified angle relative to the vertical direction as shown. Accordingly, the front tonneau cover 20 can be moved substantially vertically even if it is made of the board member.

The slider member 41 comprises a slide portion 44 that is comprised of a substantially T-shaped member engaged with the guide rail 8 and a substantially rectangular holder portion 45 that is fixed to the slide portion 44 and holds the winding-up unit 31. The holder portion 45 has an engagement groove portion 45a to receive the engagement boss portion 36 of the winding-up unit 31 therein, as shown in FIG. 5. By pushing the engagement boss portion 36 into the engagement groove 45a from the above, the winding-up unit 31 and the slider member 41 are configured as an unit. The engagement groove portion 45a is provided with a specified inclination relative to the vertical direction which is steeper than the inclination of the slide rail 8.

The wire member 42 is provided so as to extend inside the slide rail 8 as shown in FIG. 5, which fixes its middle portion 42a to the slide member 41, fixes its upper end portion 42b to the back door 4 via first and second pulleys 46, 47, and connects its lower end portion 42c to the biasing means 43. The slider member 41 can be moved substantially vertically via this wire member 42 according to the opening/closing movement of the back door 4.

The biasing means 43 is comprised of a coil spring 43a, and gives a downward-direction biasing force to the wire member 42 all the time. Thereby, a tension force is always applied to the wire member 42. This biasing force is set to be a specified force that may not interrupted the opening/closing movement of the back door 4 (namely, a force that is weaker than an assist force applied by a door opening damper 4D shown in FIG. 4).

Thus, the smooth opening/closing of the back door 4 may not be substantially interrupted with the biasing means 43.

Figure 11:
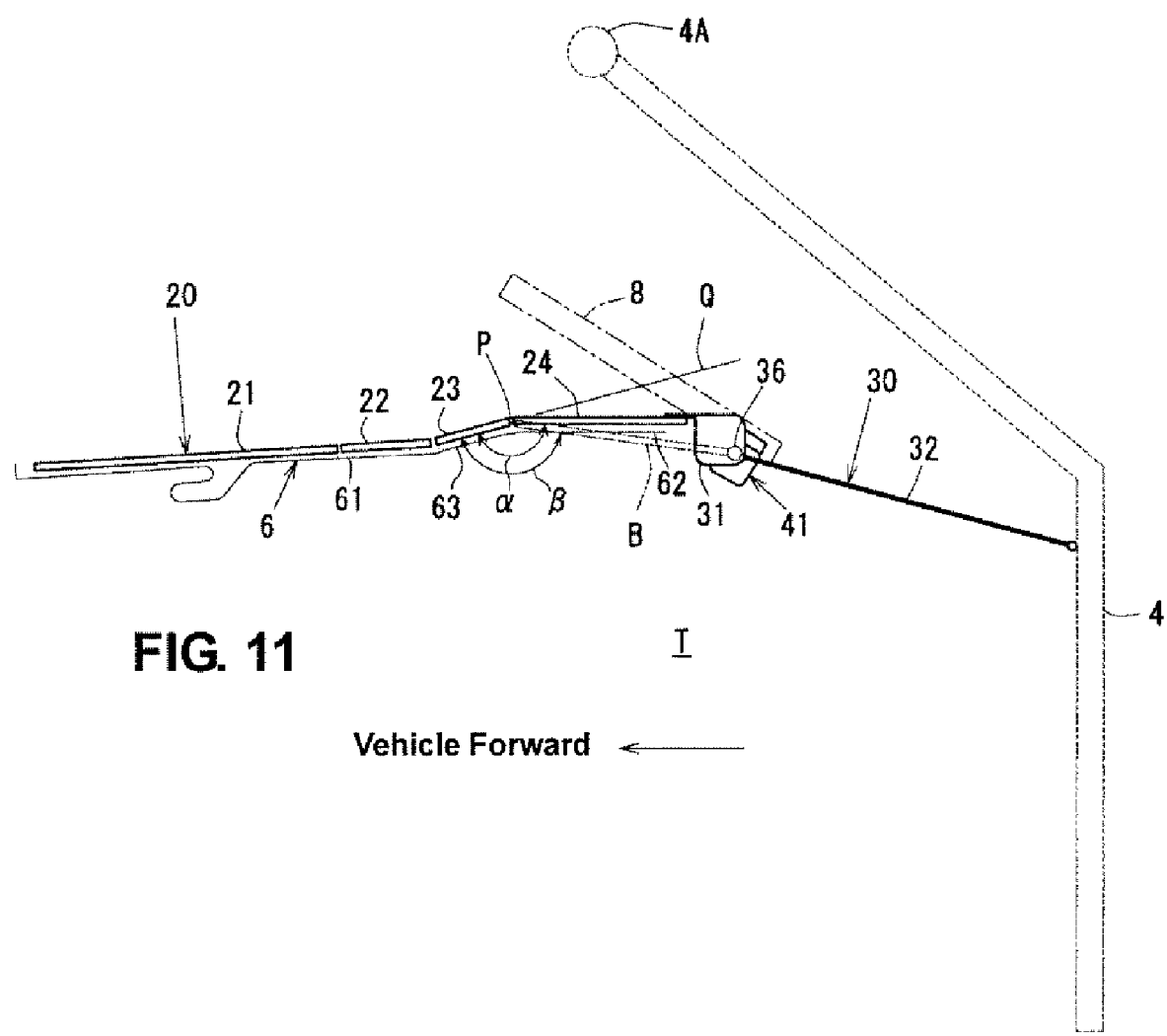
FIG. 11 is a schematic view of a state in which the tonneau cover device is closed fully.
Figure 12:
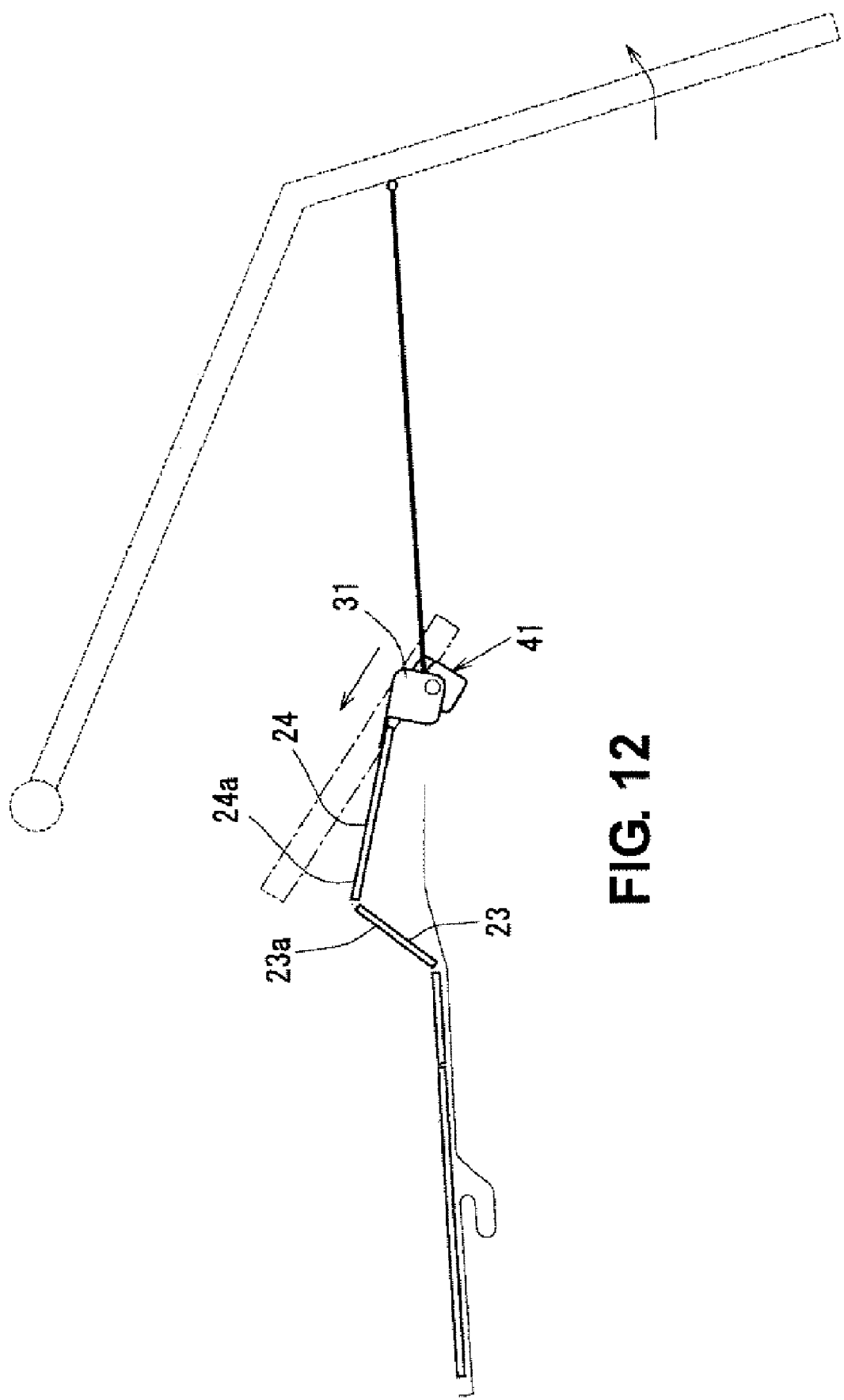
FIG. 12 is a schematic view of a first stage of an opening process of the tonneau cover device.
Figure 13:
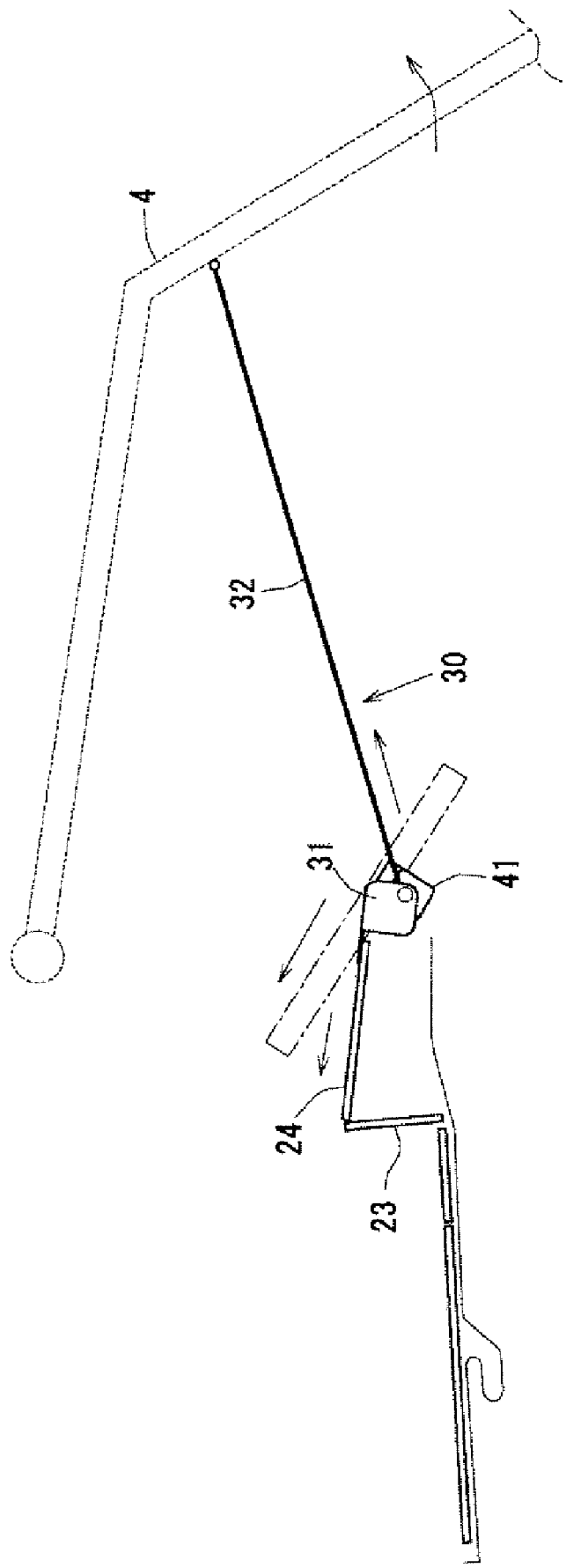
FIG. 13 is a schematic view of a second stage of the opening process of the tonneau cover device.

Next, the operational movement of the tonneau cover device described above will be described referring to FIGS. 11-16. FIG. 11 is a schematic view of a state in which the tonneau cover device is closed fully. FIG. 12 is a schematic view of a first stage of an opening process of the tonneau cover device. FIG. 13 is a schematic view of its second stage.

Figure 14:
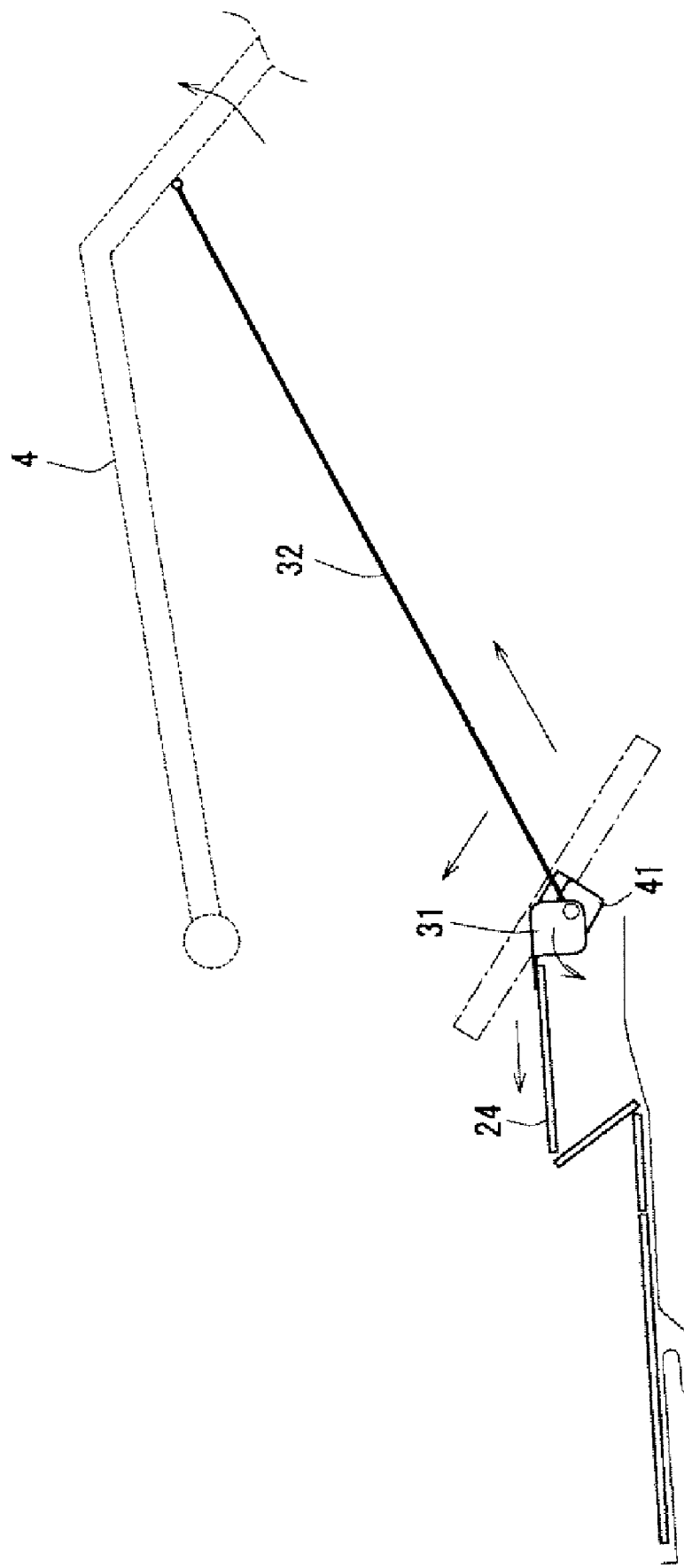
FIG. 14 is a schematic view of a third stage of the opening process of the tonneau cover device.
Figure 15:
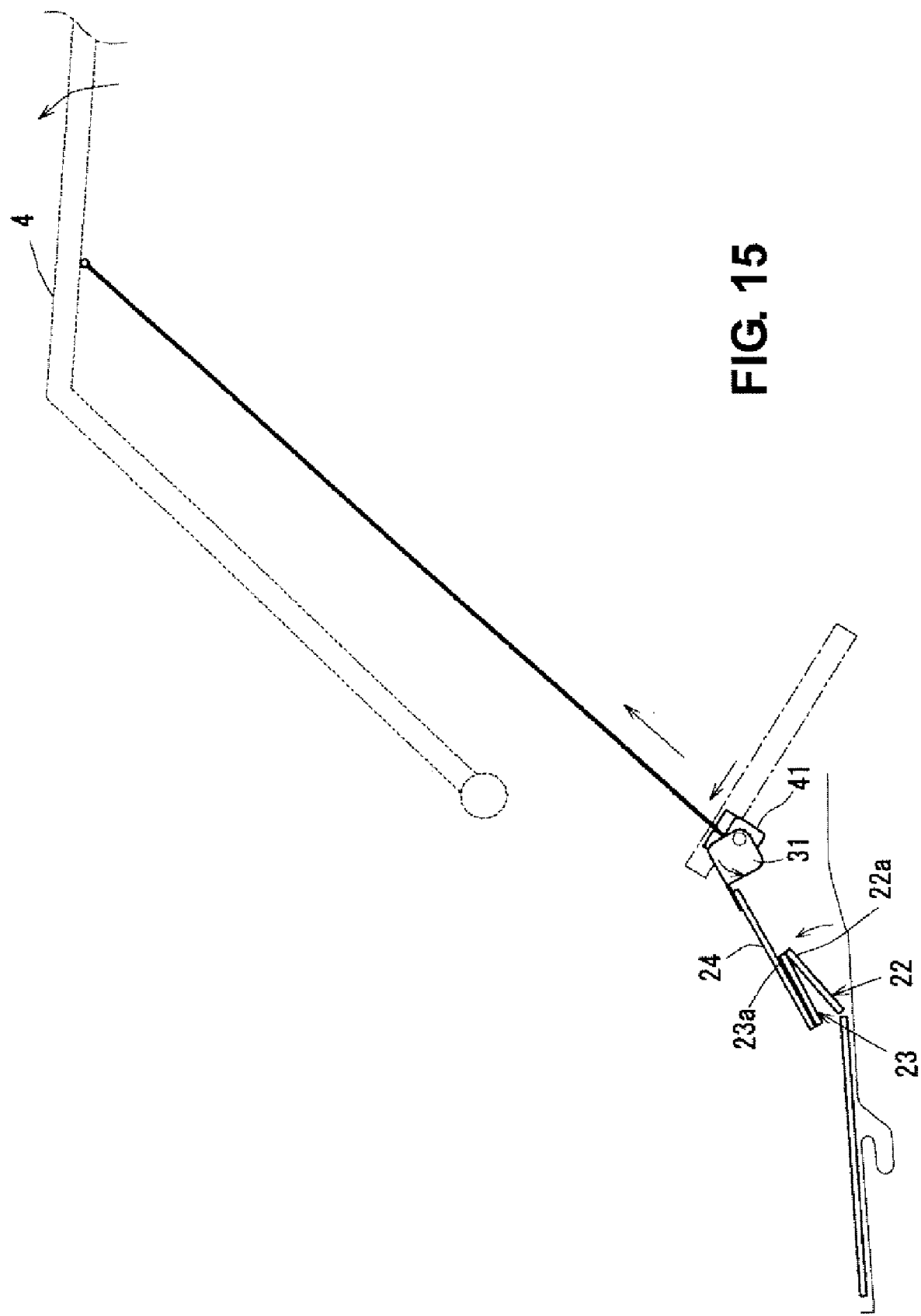
FIG. 15 is a schematic view of a fourth stage of the opening process of the tonneau cover device.
Figure 16:
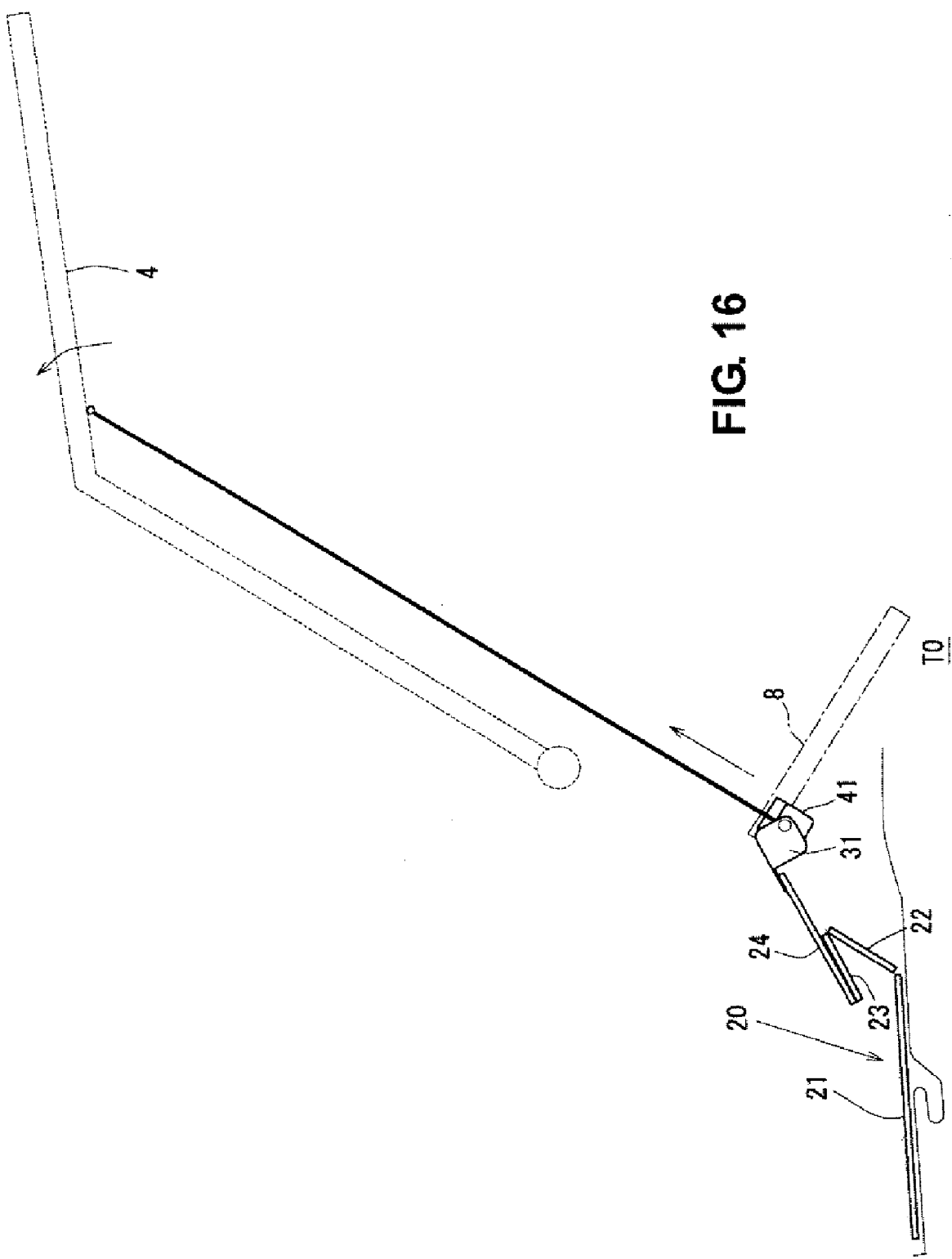
FIG. 16 is a schematic view of a state in which the tonneau cover device is opened fully.

FIG. 14 is a schematic view of its third stage. FIG. 15 is a schematic view of its fourth stage. FIG. 16 is a schematic view of a state in which the tonneau cover device is opened fully. The same components in the figures as those that have been described are denoted by the same reference characters, whose descriptions are omitted here.

As shown in FIG. 11, in a stage where the back door 4 is fully closed, the slider member 41 is located downward since the back door 4 does not pull upward the wire member (not illustrated). Accordingly, the front tonneau cover 20 and the rear tonneau cover 30 are positioned so as to extend substantially horizontally and cover over the baggage compartment T.

In this state, the position of the front tonneau cover 20 is fixed by the supporting of the shelf portion 6 in such a manner that the first and second boards 21, 22 are positioned at the lower level, the fourth board 24 is positioned at the high level, and the third board 23 is positioned in the oblique state.

Namely, by comprising the shelf portion 6 of a front lower-step portion 61, a rear upper-step portion 62, and a middle slant portion 63, the front tonneau cover 20 is positioned in a "rearup step shape."

Since the position of the front tonneau cover 20 is fixed by the shelf portion 6 as described above, the bending of the front tonneau cover 20, which will be described below, can be provided.

Meanwhile, when the sheet member 32 is withdrawn out to a certain extent, the rear tonneau cover 30 extends in such a manner that its rear portion at the side of the back door 4 is positioned at a slightly lower level.

Next, when the back door 4 is slightly opened as shown in FIG. 12, the slide member 41 moves upward slightly as the wire member (not illustrated) is pulled upward. Accordingly, the winding-up unit 31 pushes the fourth board 24 upward and forward, so that the reverse-V-shaped bending occurs between the front end 24a of the fourth board 24 and the rear end 23a of the third board 23.

This reverse-V-shaped bending is caused by the shelf portion 6 that provides the front tonneau cover 20 with the above-described position of the "rear-up step shape."

Namely, the fourth board 24 is held in its high position and the third board 24 is held in its oblique position, so there occurs a bending angle α on a lower side between the third board 23 and the fourth board 24 as shown in FIG. 11. Since the bending direction of the board members is determined by the bending angle α, this bending portion P having the bending angle α causes the reverse-V-shaped bending.

The reverse-V-shaped bending may be promoted by the position of the engagement boss portion 36 of the winding-up unit 31, i.e., the connecting position (a force acting point) of the winding-up unit 31 with the slider member 41. Namely, if it is imagined that a dynamically imaginary board member B is provided on a straight line that interconnects the position of the engagement boss portion 36 and the bending portion P as shown in FIG. 11, a bending angle β that occurs between the imaginary board member B and the third board 23 may become further smaller. Thereby, the reverse-V-shaped bending at the bending portion P may be made occur further easily, thereby promoting the reverse-V-shaped bending.

Accordingly, it can be understood that the reverse-V-shaped bending between the third board 23 and the fourth board 24 is determined by the position angle of the third board 23 and the position of the engagement boss portion 36 of the winding-up unit 31 in such a manner that the degree of this bending becomes greater when the position of the engagement boss portion 36 of the winding-up unit 31 is set greatly below a plan extending line Q of the third board 23).

Next, in the stage where the back door 4 is further opened as shown in FIG. 13, the slider member 41 moves to the central position and the winding-up unit 31 moves forward and upward. Thereby, the fourth board 24 is pushed forward and the reverse-V-shaped bending between the fourth board 24 and the third board 23 becomes greater. While, the V-shaped bending occurs between the second board 22 and the third board 23, so the movement of the third board 23 is not interrupted.

Herein, the sheet member 32 of the rear tonneau cover 30 is withdrawn rearward greatly according to the opening movement of the back door 4.

Then, when the back door 4 is in the opening stage shown in FIG. 14, the slider member 41 further slides upward and the winding-up unit 31 moves forward and upward further. Herein, the winding-up unit 32 rotates forward (see an arrow in the figure) according to the movement of the fourth board 24 and the upward pulling of the sheet member 32.

The sheet member 32 is also greatly withdrawn from the winding-up unit 31 rearward and upward according to opening of the back door 4.

Further, when the back door 4 moves to its opening stage shown in FIG. 15, the slider member 41 slides upward further and the winding-up unit 31 rotates forward further, moving forward and upward further. Not only the third and fourth boards 23, 24 but the second board 22 moves upward in such a manner that its rear end 22a follows the front end 23a of the third board 23.

Finally, when the back door 4 is fully opened as shown in FIG. 16, the slider member 41 moves to the upper end of the slide rail 8 and the winding-up unit 31 is located at its foremast and uppermost position.

The second, third and fourth boards 22-24 of the front tonneau cover 20 move upward, leaving the first board 21. The sheet member 32 of the rear tonneau cover 30 extends substantially vertically in the screen shape.

Thus, the front tonneau cover 20 can enlarge the opening portion TO at the rear portion of the baggage compartment T with the moving of the tonneau boards 22-24, thereby facilitating the loading of baggage from the vehicle rear. Also, since the sheet member 32 of the rear tonneau cover 30 extends substantially vertically in the screen shape without projecting downward from the inside face of the back door 4, any interference of the head of the operator with the sheet member 32 can be prevented at the loading of baggage.

Hereinafter, the operation and effects of the present embodiment described above will be described.

According to the present invention, there are provided a pair of slide rails 8 that are provided at the rear pillar 7 so as to extend obliquely relative to the vertical direction, the front tonneau cover 20 that is provided so as to extend substantially horizontally above the rear floor panel 2, the rear end of the front tonneau cover 20 being supported at the slide rails 8, the rear tonneau cover 30 that is provided at the rear end of the front tonneau cover 20, the rear end portion of the rear tonneau cover 30 being coupled to the back door 4, the rear tonneau cover 30 having the rollable type of sheet member 32, and the slide mechanism 40 operative to move substantially vertically the rear end of the front tonneau cover 20 and the front end of the rear tonneau cover 30 along the slide rails 8.

Accordingly, the slide mechanism 40 moves obliquely vertically the rear end of the front tonneau cover 20 and the front end of the rear tonneau cover 30. Thereby, the front tonneau cover 20 does not project outward (rearward) from the baggage compartment T, so it does not interfere with the quarter window glasses 5 at the side faces of the baggage compartment T. Further, the rear tonneau cover 30 is comprised of the rollable type of sheet member 32, and the rear tonneau cover 30 is withdrawn out in such a manner that it follows the rear end of the front tonneau cover 20 when the door back 4 is opened. Thereby, the tonneau cover can be located further forward compared to a case where the tonneau cover is comprised of the board member that is fixed to the back door. Accordingly, the rear tonneau cover 30 can be located forward, not projecting downward, when the back door 4 is opened. Thereby, any interference of the head of the operator with the sheet member 32 can be avoided at the loading of baggage. Further, even if there occurred slight interference, the sheet member 32 is flexible and therefore such interference may not hurt the operator. Also, since the sheet member 32 does not project downward from the back door 4, the appearances of the opened back door 4 can be improved. The first tonneau cover may be comprised of any type of member. Thus, in the tonneau cover device 10 of the vehicle that extends substantially horizontally over the rear portion of the baggage compartment T, the front and rear tonneau covers 20, 30 are pulled upward according to the opening/closing movement of the back door 4, so the loading or unloading of the baggage can be facilitated and the appearances can be improved.

Also, according to the present embodiment, the front tonneau cover 20 is comprised of the board members 21-24. Thereby, the rear portion of the baggage compartment T is covered with the board members 21-24 having a proper rigidity. Accordingly, appearances of the baggage compartment T can be improved with a state in which the front tonneau cover 20 extends over the baggage compartment T. Further, the front tonneau cover 30 can be used as a member on which some object is placed. Thus, functionality of the tonneau cover device 10 can be further improved, keeping good appearances of the baggage compartment T, with the tonneau cover device 10 extending over.

Further, according to the present embodiment, the sheet member 32 of the rear tonneau cover 30 has the side cut-away portions 37 that are operative to prevent interference with the side peripheral portions BE of the opening portion BO at the rear face of the vehicle body when the back door 4 is open. Since the side cut-away portions 37 are provided at the sheet member 32, any interference of the sheet member 32 withdrawn out at the opening of the back door 4 with the side peripheral portions BE of the opening portion BO of the vehicle body can be avoided. Accordingly, the side peripheral portions BE of the opening portion BO of the vehicle body may not be hurt by the sheet member withdrawn out. Further, since the sheet member 32 withdrawn out has no contact with the side peripheral portions BE of the opening portion BO, the operation of the rear tonneau cover 30 may not be interrupted, thereby proving its smooth withdrawing. Thus, even if the rear tonneau cover 30 is comprised of the rollable type of sheet member 32 and configured to be withdrawn out at the opening of the back door 4, the side peripheral portions BE of the opening portion BO of the vehicle body may not be hurt by the sheet member withdrawn out and its withdrawing operation can be conducted smoothly.

Also, according to the present embodiment, the sheet member 32 of the rear tonneau cover 30 has the mesh portion 38. Thereby, the proper forward or rearward visibility through the mesh portion 38 can be obtained even when the sheet member 32 extends substantially vertically in the screen state between the vehicle compartment and the vehicle rear portion. Accordingly, the operator may have necessary communications with the passenger in the vehicle compartment when loading the baggage, and the passenger in the vehicle compartment can also recognize the operator behind as well. Thus, exchanging of information through the sheet member 32 of the rear tonneau cover 30 can be facilitated, and the safety can be improved. Herein, any other embodiments than the mesh portion 38, such as a through hole, a slit or the like, which have a transparency, can be applied. Also, any sheet member which is made of a transparent material or a semi-transparent one may be applied.

Further, according to the present embodiment, the front tonneau cover 20 is comprised of a plurality of board members 21-24 that are disposed in the vehicle longitudinal direction, and the front tonneau cover 20 is configured to bend between the third and fourth boards 23, 24 at its vertical movement along the slide rails 8. Thereby, since the front tonneau cover 20 bends between the adjacent board members (the third and fourth boards 23, 24), the board members 21-24 of the first tonneau cover 20 move forward and thus the rear opening portion TO enlarges. Accordingly, the rear opening portion TO at the rear portion of the baggage compartment T can be enlarged without puling upward the front tonneau cover 20 greatly.

Further, according to the present embodiment, bending between the third and fourth boards 23, 24 is set to be the reverse-V-shaped bending. Namely, the fourth board 24 is positioned at the higher level and the third board 23 is positioned at the oblique state in order to properly obtain the reverse-V-shaped bending. Therefore, the front tonneau cover 20 is located "stepwise" in such a manner that the rearward-located board member 24 is positioned at the higher level, so that appearances of the front tonneau cover 20 in the baggage compartment T can be improved. Thus, the front tonneau cover 20 that is configured to properly bend can improve its appearances in the baggage compartment T.

Also, according to the present embodiment, at the side panel 3 of the baggage compartment T is provided the shelf portion 6 operative to cause the reverse-V-shape bending between the third and fourth boards 23, 24. Specifically, the upper-step portion 62 and the slant portion 63 are formed. Thereby, the reverse-V-shaped bending can be properly provided to the front tonneau cover 20. Accordingly, the reverse-V-shaped bending of the front tonneau cover 20 can be provided surely without any particular mechanism provided at the front tonneau cover 20 itself for that. Thus, the structure of the front tonneau cover 20 can be made simple, and the front tonneau cover 20 can be manufactured lightly and inexpensively.

Also, according to the present embodiment, the engagement boss portion 36 of the winding unit 31 is coupled to the slider member 41 at the position that is below the plan extending line Q (see FIG. 11) of the third board 23 of the front tonneau cover 20. Thereby, when the winding-up unit 31 moves obliquely upward along the slide rail 8, the engagement boss portion 36 may become a point for pushing up the fourth board 24, thereby surely causing the reverse-V-shaped bending to the front tonneau cover 20. Thus, the fourth board 24 of the front tonneau cover 20 is pushed upward at its rear end, and thereby the reverse-V-shaped bending can be generated surely at the front tonneau cover 20.

Further, according to the present embodiment, the front tonneau cover 20 has the first and second boards 21, 22 in addition to the third and fourth boards 23, 24. Thereby, a wider area above the baggage compartment T can be covered with the board members 21-24 of the front tonneau cover 20. Thus, the wider area above the baggage compartment T can be covered by the front tonneau cover 20, enlarging the opening portion T at the rear portion of the baggage compartment properly.

Also, according to the present embodiment, the front and rear tonneau covers 20, 30 are provided detachably at the vehicle body. Thereby, these front and rear tonneau covers 20, 30 can be removed away from the upper portion of the baggage compartment T when they are not necessary. Thus, the baggage-compartment space at the vehicle rear portion can be used widely when the tonneau cover device 10 is unnecessary, thereby enlarging the space for the baggage compartment.

Further, according to the present embodiment, the first board 21 of the front tonneau cover 20 has the hinge pin 27a for fixing to the vehicle body. Thereby, the foremost first board 21 of the front tonneau cover 20 is always fixed to the vehicle body. Accordingly, the position of the front tonneau cover 20 can be surely fixed by the first board 21 which may not concern the enlargement of the opening portion TO at the rear portion of the baggage compartment T. Thus, the bending point of the front tonneau cover 20 is fixed surely, so the bending movement of the front tonneau cover 20 can be surely provided, allowing the front tonneau cover 30 and the like to be detachable.

Also, according to the present embodiment, the front and rear tonneau covers 20, 30 are configured to be foldable. Thereby, the tonneau cover device 10, which extends widely, can be folded compactly when they are removed from the vehicle body. Thus, the removed front and rear tonneau covers 20, 30 can be compactly stored in the sub trunk portion 2a, which may improve the facility of the tonneau cover device 10.

Also, according to the present embodiment, the slide mechanism 40 is configured to move vertically according to the opening-closing movement of the back door 4. Thereby, whenever the back door 4 opens or closes, the rear end of the front tonneau cover 20 and the front end of the rear tonneau cover 30 are moved vertically. Accordingly, since the opening portion TO behind the tonneau cover device 10 can be enlarged just by opening or closing the back door 4, the facility at the loading of the baggage into the baggage compartment T or the unloading it from the baggage compartment T can be improved. Thus, the operator can conduct the baggage loading/unloading easily without directly operating the tonneau cover device 10.

Further, according to the present embodiment, the slide mechanism 40 comprises the wire member 42, the upper end portion 42b of which is fixed to the back door 4 and its middle portion 42a of which is fixed to the slider member 41 (see FIG. 5). Thereby, the tonneau cover device 10 can be opened or closed mechanically by utilizing the opening/closing movement of the back door 4 itself. Thus, the opening/closing movements of the back door 4 and the tonneau cover device 10 can be mechanically linked with a simple structure of the wire member 42, so the reduction of the manufacturing cost reduction can be achieved.

Embodiment 2

Figure 17:
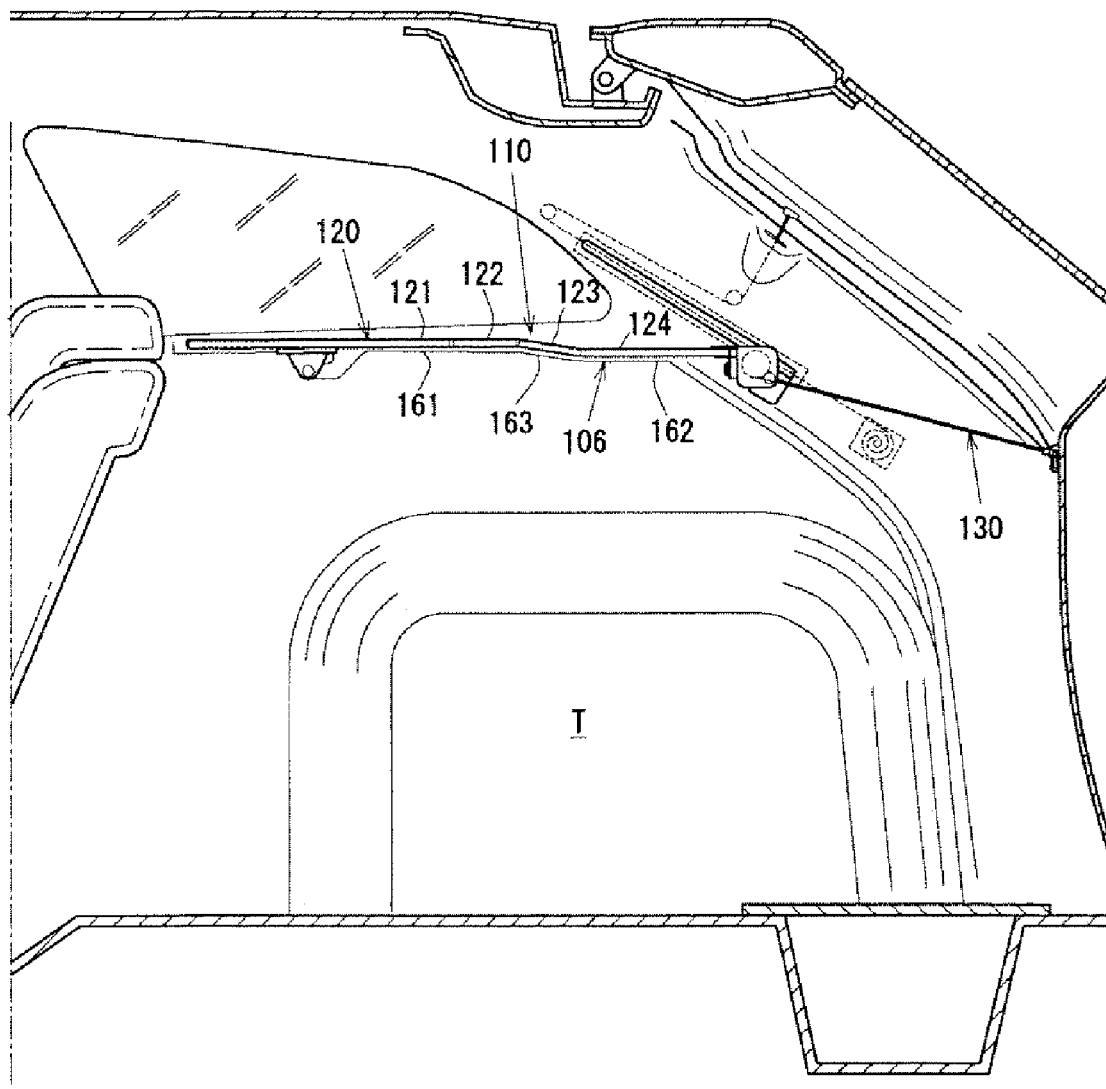
FIG. 17 is a side view of the baggage compartment with a tonneau cover device according to a second embodiment.
Figure 18A:
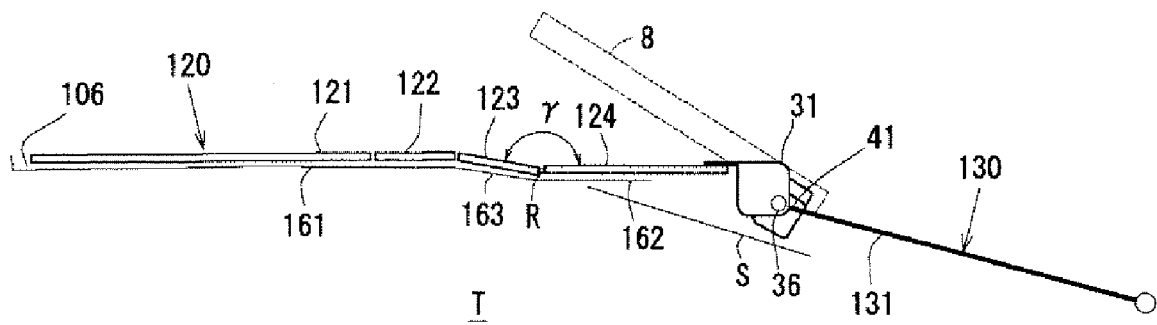
FIG. 18A is a schematic view of the tonneau cover device that is in a closed state.
Figure 18B:
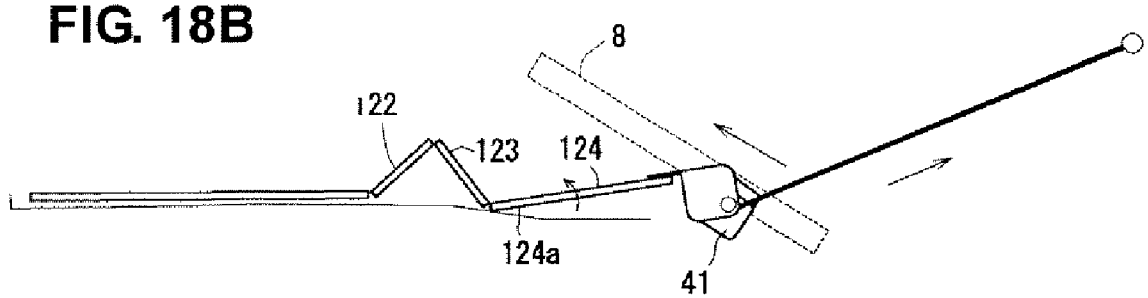
FIG. 18B is a schematic view of the tonneau cover device that is in the process of opening.
Figure 18C:
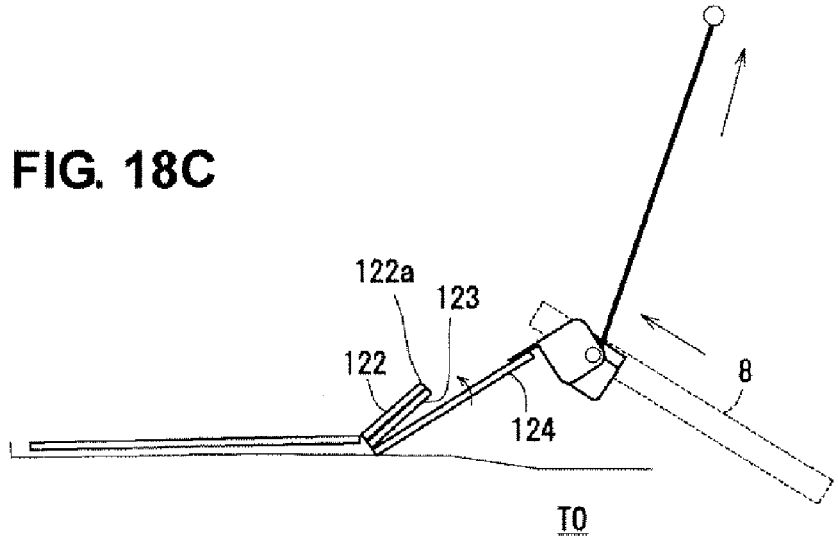
FIG. 18C is a schematic view of the tonneau cover device that is in an opened state.

A second embodiment will be described referring to FIGS. 17 and 18. FIG. 17 is a side view of the baggage compartment with a tonneau cover device according to a second embodiment. FIG. 18A is a schematic view of the tonneau cover device that is in a closed state, FIG. 18B is a schematic view of the tonneau cover device that is in the process of opening, and FIG. 18C is a schematic view of the tonneau cover device that is in an opened state. The same components in the figures as those of the previous embodiment are denoted by the same reference characters, whose descriptions are omitted here.

In the tonneau cover device 110 of the present embodiment, contrary to the first embodiment as shown in FIG. 17, a rearward-located board member 124 of the front tonneau cover 120 is located at a lower level than forward-located board members 121, 122, 123, thereby generating a V-shaped bending between a third board 123 and a fourth board 124.

Namely, as shown in FIG. 18A, a shelf portion 106 to support the front tonneau cover 120 is comprised of a front upper-step portion 161, a rear lower-step portion 162, and a middle slant portion 163. Thereby, the V-shaped bending occurs between the third board 123 and the fourth board 124 as the front tonneau cover 120 moves upward.

The operational movement of the tonneau cover device 110 will be described referring to FIGS. 18A-C.

In a closed state shown in FIG. 18A, since the slider member 41 is located at the lower end of the slide rail 8, the front tonneau cover 120 and the rear tonneau cover 130 extend substantially horizontally over the baggage compartment T.

Then, when the slider member 41 moves to the middle position of the slide rail 8, which is in the process of opening as shown in FIG. 18B, the fourth board 124 is pushed forward so that a front end 124a of the fourth board 124 goes under the third board 123. Thus, the V-shaped bending between the third board 123 and the fourth board 124 occurs.

Namely, since a bending angle γ is generated on an upper side between the third board 123 and the fourth board 124 as shown in FIG. 18A, a bending portion R causes the V-shaped bending.

Further, according to the present embodiment, the engagement boss portion 36 of the winding unit 31 is located above a plan extending line S of the third board 123, thereby promoting the V-shaped bending.

Then, in an open state shown in FIG. 18C, the second board 122 is pushed forward as well, and moves upward along with the third and fourth boards 123, 124 in such a manner that its rear end 122a moves upward. Thus, the opening portion TO at the rear portion of the baggage compartment is enlarged, so the loading of baggage from the vehicle rear can be facilitated.

Accordingly, the front tonneau cover 120 bends in the V shape between the third board 123 and the fourth board 124 in the present embodiment as well, so the opening portion TO at the rear portion of the baggage compartment T can be enlarged. Particularly, since the folded middle board member (the second board 122, the third board 123) does not expose downward by this V-shaped bending, any interference of these board members 122, 123 with baggage under the loading may not occur. Thus, the loading of baggage can be smoothly conducted, thereby improving the operation of the tonneau cover device 110. Other operation and effects of the present embodiment are substantially the same as those of the first embodiment described above.

Embodiment 3

Figure 19:
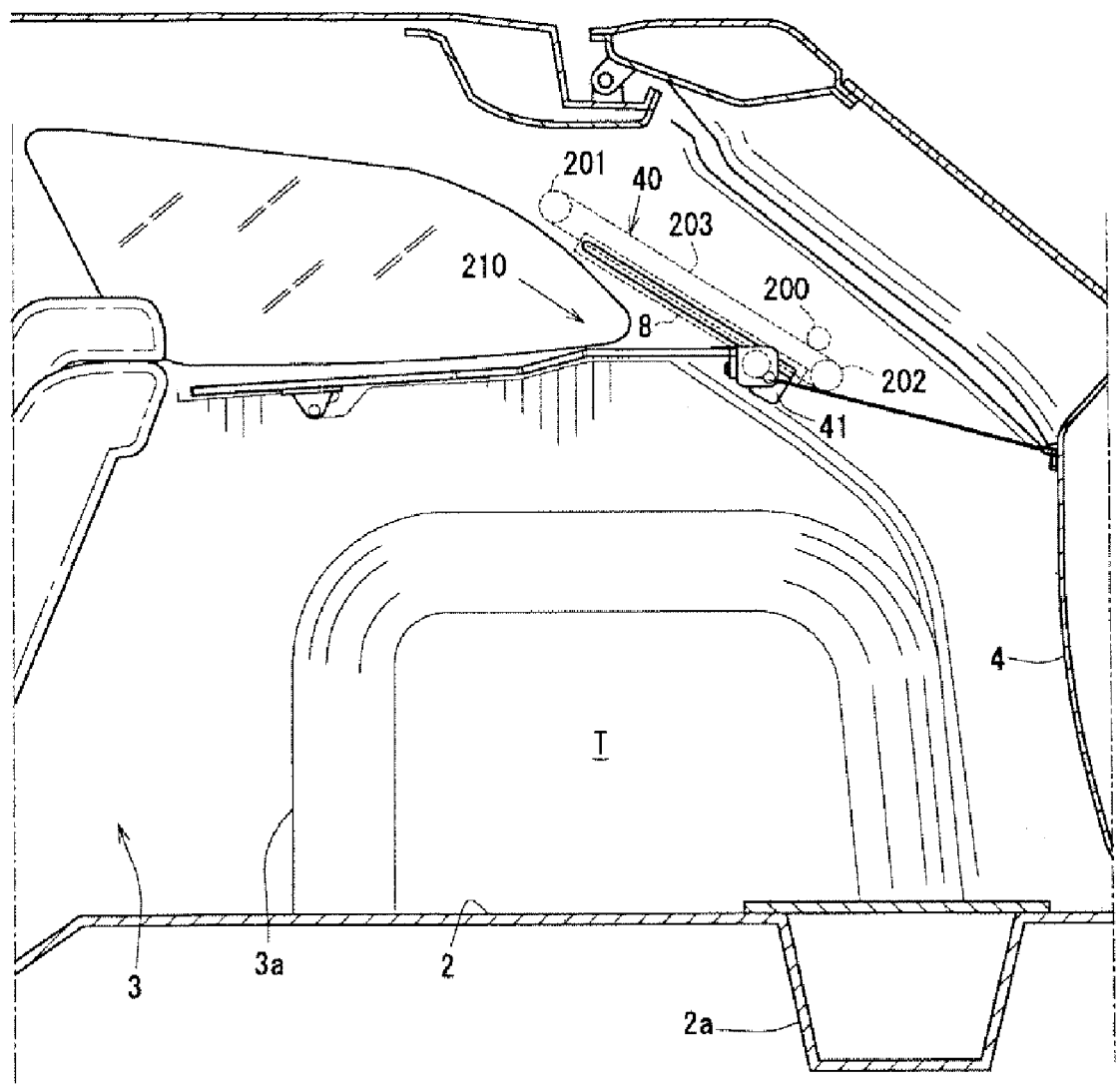
FIG. 19 is a side view of the baggage compartment with a tonneau cover device according to a third embodiment.
Figure 20:
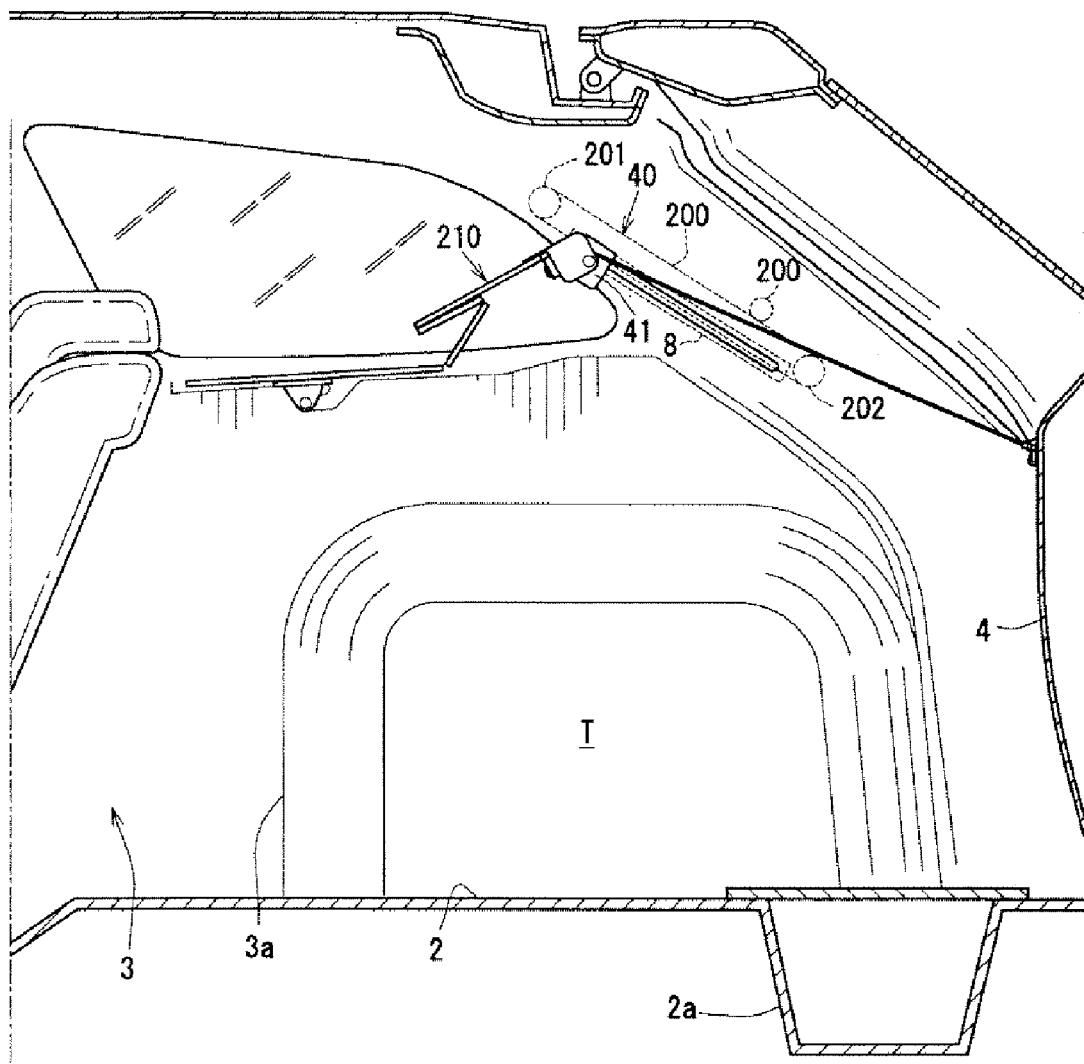
FIG. 20 is a side view of the baggage compartment with the tonneau cover device that is moved upward when the back door is closed.
Figure 21:
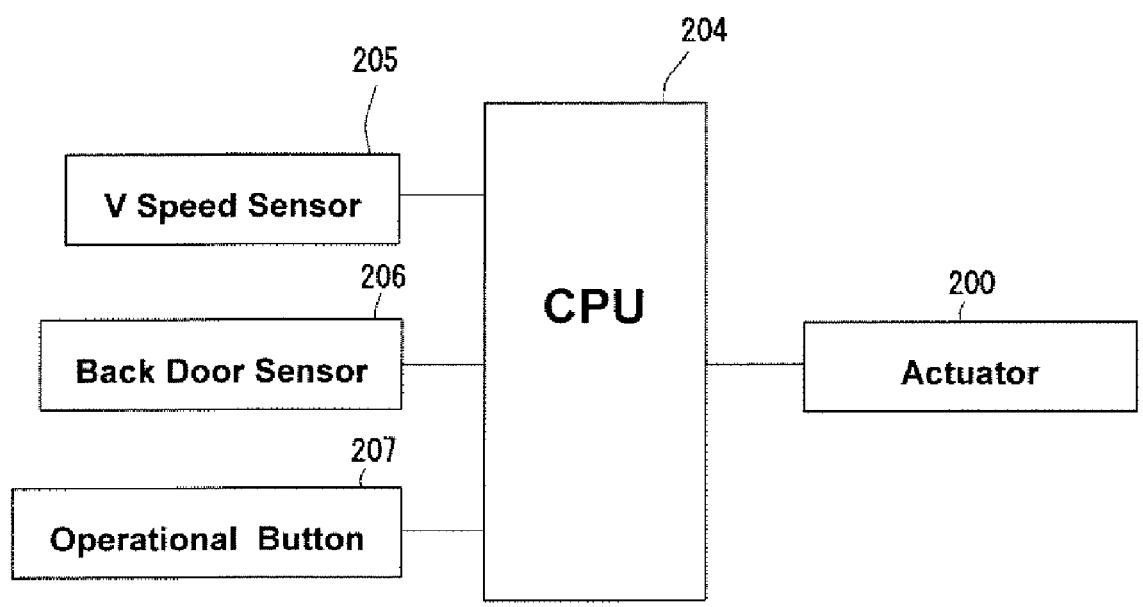
FIG. 21 is a system block diagram of the tonneau cover device.

A third embodiment will be described referring to FIGS. 19-20. FIG. 19 is a side view of the baggage compartment with a tonneau cover device according to a third embodiment. FIG. 20 is a side view of the baggage compartment with the tonneau cover device that is moved upward when the back door is closed. FIG. 21 is a system block diagram of the tonneau cover device. The same components in the figures as those of the previous embodiments are denoted by the same reference characters, whose descriptions are omitted here.

In the tonneau cover device 210 of the present embodiment, the slider member 41 is moved by an electromotive actuator 200, instead of the opening movement of the back door 4.

Specifically, as shown in FIG. 19, there are provided an upper pulley 201 and a lower pulley 202 above and below the slide rail 8, respectively. And, a belt member 203 is set between the upper and lower pulleys 201, 202, and the slider member 41 is fixed to the belt member 203. Herein, the belt member 203 is driven by the electromotive actuator 200, such as a stepping motor.

The electromotive actuator 200 is controlled by the system block shown in FIG. 21. A vehicle speed sensor 205, a back door sensor 206, and an operational button 207 are coupled to a CPU 204 to control the electromotive actuator 200. A vehicle stop state is detected by the vehicle speed sensor 205, an opening/closing state is detected by the back door sensor 206, and the operator's command is detected by the operational button 207.

The CPU 204 executes a calculation control based on detections by the above-described sensors and the like, and outputs a control signal to the electromotive actuator 200.

Thereby, there can be provide a state in which the tonneau cover device 210 extends despite the back door 4 being closed as shown in FIG. 20. Accordingly, the baggage can be stored in the baggage compartment T by properly changing the state of the tonneau cover device.

Further, since the opening/closing speed of the tonneau cover device 210 is configured to be set independently from that of the back door 4, it can be set at a specified constant speed.

As described above, according to the present embodiment, the slide mechanism 40 comprises the electromotive actuator 200. Thereby, the tonneau cover device 210 can be opened or closed regardless of the opening/closing movement of the back door 4. Further, since the speed of the opening/closing movement of the tonneau cover device 210 is not restricted by the speed of the opening/closing movement of the back door 4, the tonneau cover device 210 can be operated freely. Thus, the flexibility of the opening/closing movement of the tonneau cover device 210, thereby further increasing its functionality. Other operation and effects of the present embodiment are substantially the same as those of the first embodiment described above.

Embodiment 4

Figure 22:
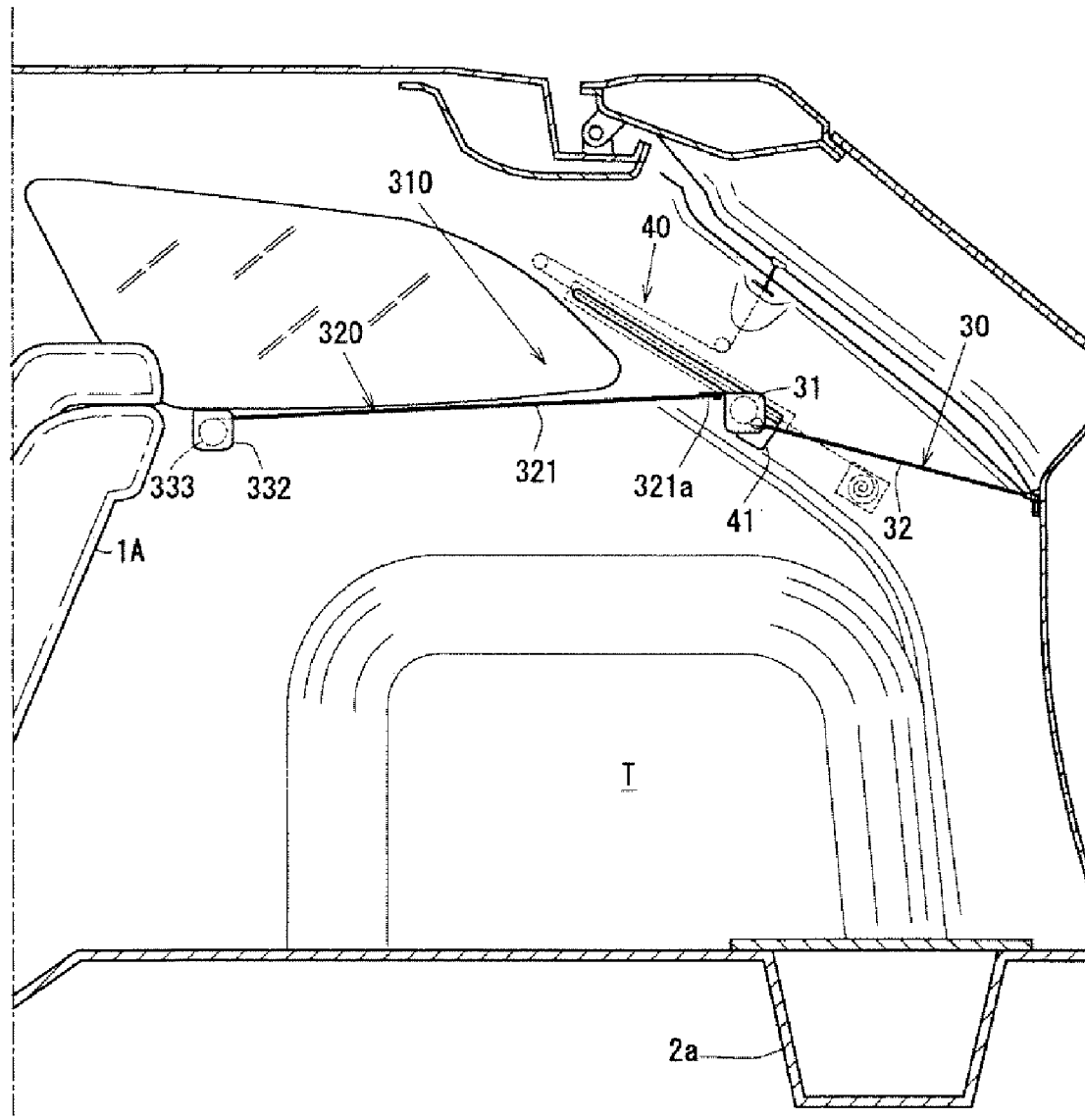
FIG. 22 is a side view of the baggage compartment with a tonneau cover device according to a fourth embodiment.
Figure 23:
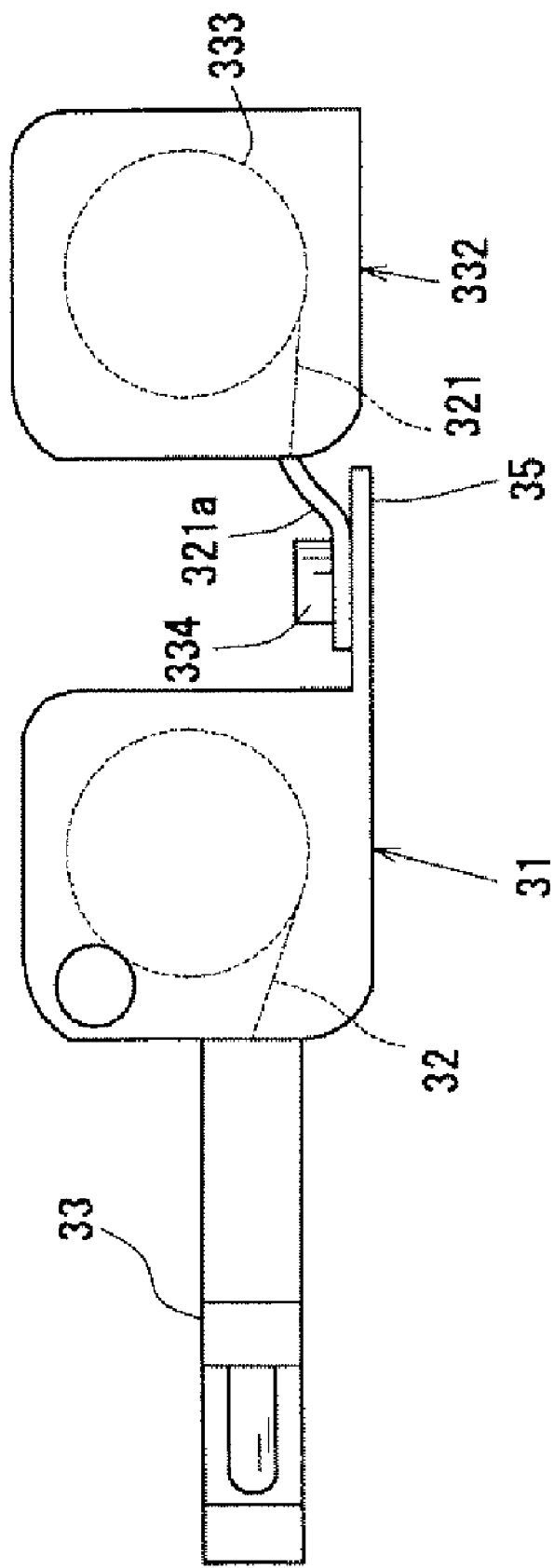
FIG. 23 is a side view showing a storage state of a front tonneau cover and a rear tonneau cover.

A fourth embodiment will be described referring to FIGS. 22, 23. FIG. 22 is a side view of the baggage compartment with a tonneau cover device according to a fourth embodiment. FIG. 23 is a side view showing a storage state of a front tonneau cover and a rear tonneau cover. The same components in the figures as those of the previous embodiments are denoted by the same reference characters, whose descriptions are omitted here.

In the tonneau cover device 310 of the present embodiment, a front tonneau cover 320 is the rollable type as well as the rear tonneau cover 30. Thus, the baggage compartment T is covered with both sheet members 321, 32.

As shown in FIG. 22, the front tonneau cover 320 comprises a winding-up unit 332 that is provided so as to extend in the vehicle width direction behind the seat back 1A of the rear seat, and the sheet member 321 that is operative to be withdrawn rearward. The winding-up unit 332 has a winding-up roller 333 that is biased in the winding-up direction. A tip portion 321a of the sheet member 321 is fixed via a fixing pin 334 (see FIG. 23) to the engagement piece portion 35 of the winding-up unit 30 for the rear tonneau cover 30.

Thereby, according to the vertical movement of the slider member 41 of the slide mechanism 40, not only the sheet member 32 of the rear tonneau cover 30 but the front tonneau cover 320 moves vertically.

Particularly, since the front tonneau cover 320 is not comprised of board members, it may not need to consider its bending direction and the like, so no shelf portion or the like is necessary.

Further, when the tonneau cover device 310 is detached and stored in the sub trunk portion 2a, as shown in FIG. 23, the sheet members 32, 321 are withdrawn into the winding-up units 31, 332. Accordingly, the tonneau cover device 310 becomes compacter than the tonneau cover device 10 of the above-described first embodiment. Thereby, this very compact device 310 can be properly stored in the sub trunk portion 2a.

As described above, according to the present embodiment, the front tonneau cover 320 is comprised of the rollable type. Thereby, since both the front and rear tonneau covers 320, 30 are formed without board members, the tonneau cover device can be made properly compact when they are removed. Thus, the removed front and rear tonneau covers 320, 30 can be further compactly stored in the sub trunk portion 2a, which may further improve the facility of the tonneau cover device 320. Other operation and effects of the present embodiment are substantially the same as those of the first embodiment described above.

Embodiment 5

Figure 24:
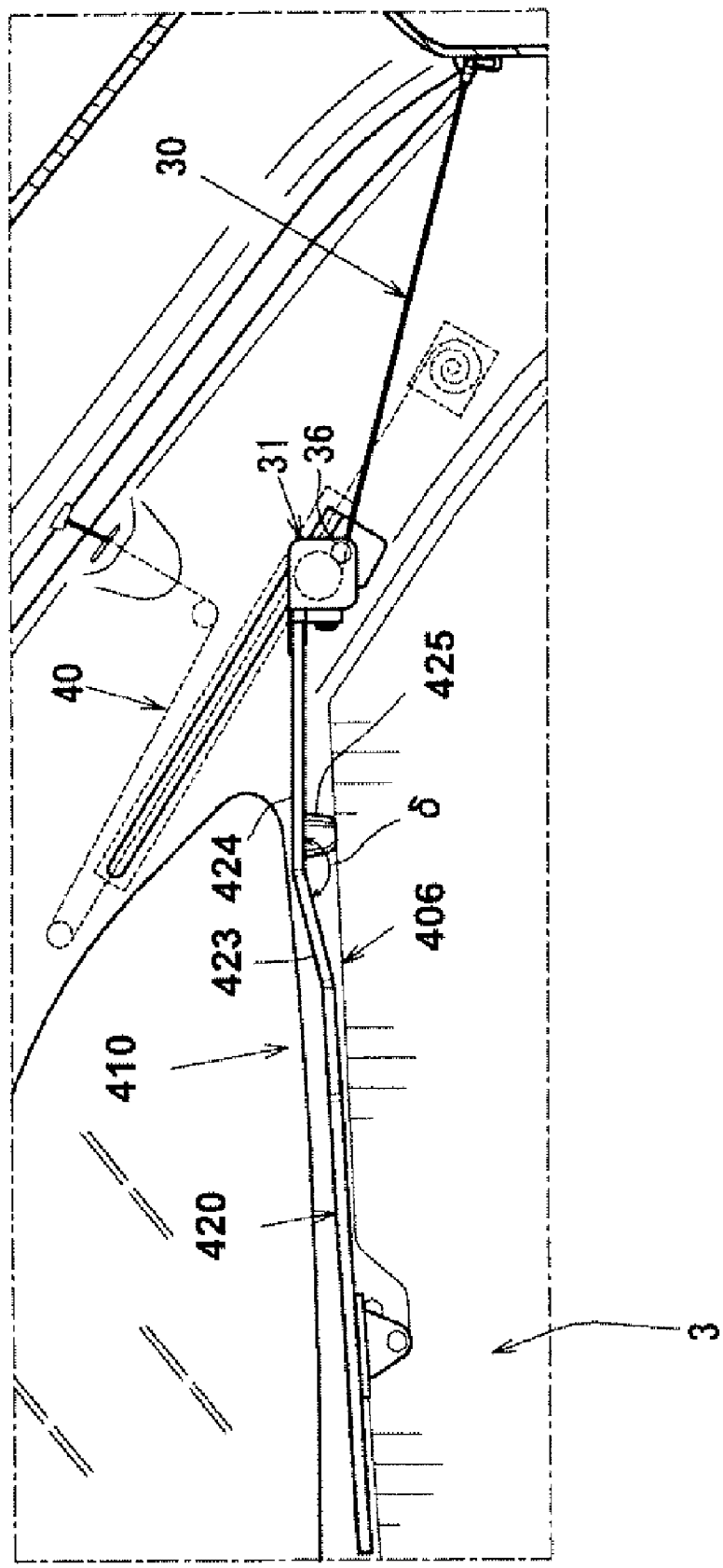
FIG. 24 is a side view of the baggage compartment with a tonneau cover device according to a fifth embodiment.
Figure 25:
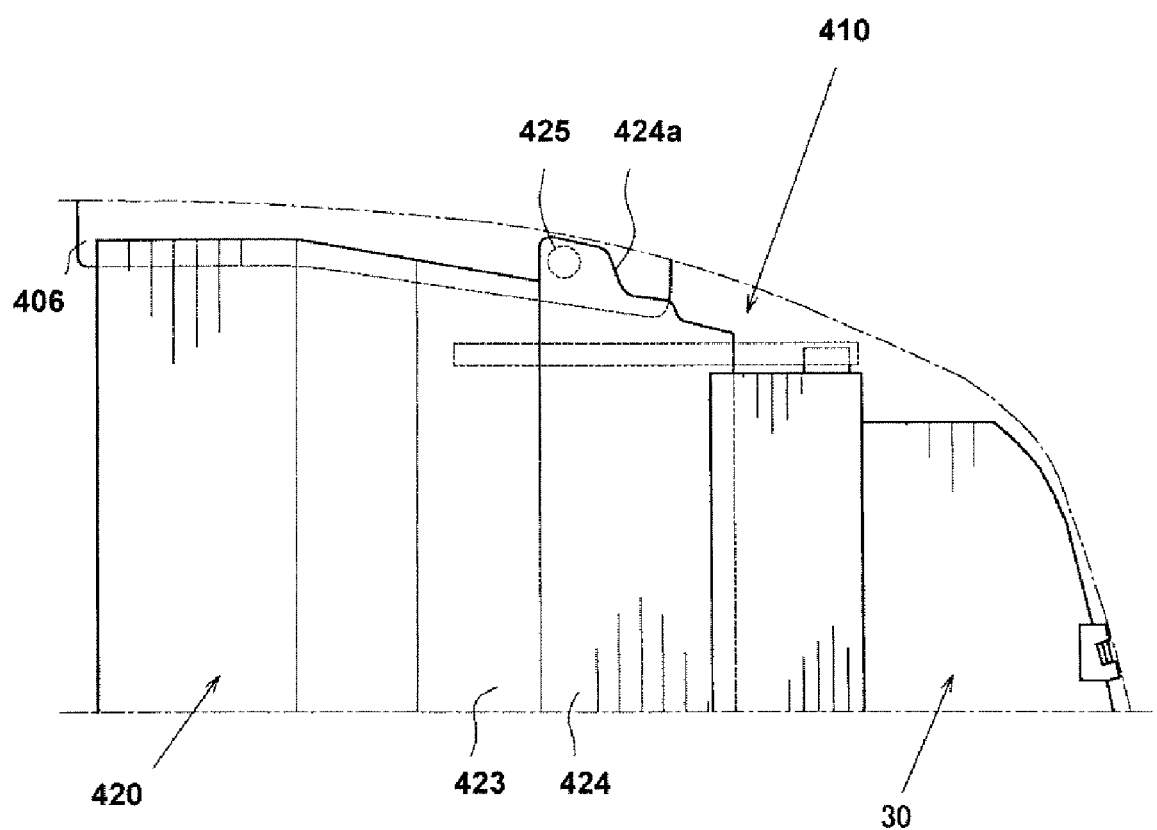
FIG. 25 is a plan view of a side end portion of the a front tonneau cover.

A fifth embodiment will be described referring to FIGS. 24, 25. FIG. 24 is a side view of the baggage compartment with a tonneau cover device according to a fifth embodiment. FIG. 25 is a plan view of a side end portion of the a front tonneau cover. The same components in the figures as those of the previous embodiments are denoted by the same reference characters, whose descriptions are omitted here.

In a tonneau cover device 410 of the present embodiment, as shown in FIG. 24, a shelf portion 406 provided at the side portion is formed in a straight (flat) shape, at a side end of a fourth board 424 of a front tonneau cover 420 is provided a projection portion 424a that projects outward (see FIG. 25), and at a bottom face of the projection portion 424a is provided a leg portion 425, so there occurs a bending angle δ on a lower side between the fourth board 424 and a third board 423 as shown.

Thus, since the bending angle δ is generated on the lower side between the fourth board 424 and the third board 423, like the first embodiment, the reverse-V-shaped bending occurs between the third and fourth boards 423, 424 as the rear end of the front tonneau cover 420 is moved upward by the slide mechanism 40.

Specifically, as shown in FIG. 25, to the lower face of the above-described projection portion 424a is fixed to the boss-shaped leg portion 425 so as to contact the shelf portion 406. The opposite side has the same leg portion 425 as well.

Thus, by providing the leg portion 425 on the side of the fourth board 424, the reverse-V-shaped bending can be generated between the third and fourth boards 423, 424 at the extending front tonneau cover 420 despite applying the straight (flat) shelf portion 406 formed at the vehicle body.

Thus, according to the present embodiment, like the above-described embodiments, the opening portion TO generated behind the front tonneau cover 420 can be enlarged by the upward movement of the tonneau cover device 410, and the shelf portion 406 at the side panel 3 can be easily formed. Also, the common side panel 3 may be applied.

Further, since it may not be necessary to consider longitudinal location relationships between the respective boards 423, 424 and the shelf portion 406 when the tonneau cover device 410 is made extend over the baggage compartment, the operator can conduct setting of the tonneau cover device 410 easily. Other operation and effects of the present embodiment are substantially the same as those of the first embodiment described above.

The constitution of the present invention corresponds to the above-described embodiments as follows. The guide rail corresponds to the slide rail 8. The first tonneau cover corresponds to the front tonneau covers 20, 120, 320, 420. The second tonneau cover corresponds to the rear tonneau covers 30, 130. The slide drive mechanism corresponds to the slide mechanism 40. The transparent portion corresponds to the mesh portion 38. The adjacent board members correspond to the third and fourth boards 23, 24, the third board and fourth boards 123, 124, or the third board and fourth boards 423, 424, The guide means corresponds to the upper-step portion 62 and the slant portion 63, the lower-step portion 162 and the slant portion 163, or the leg portion 425.

The present intention should not be limited to the above-described embodiments, and any other modifications and improvements may be applied within the scope of a spirit of the present invention.

What is claimed is:

1. A tonneau cover device of a vehicle, which is provided so as to extend substantially horizontally above a baggage-compartment floor at a vehicle-body rear portion that is equipped with a back door to open and close a vehicle-body opening portion formed at a vehicle-body rear face and the baggage-compartment floor disposed in front of the vehicle-body opening portion, comprising:
a pair of guide rails provided at both-side walls of a baggage compartment so as to extend obliquely relative to a vertical direction,
a first tonneau cover provided so as to extend substantially horizontally above the baggage-compartment floor, a rear end of the first tonneau cover being supported at the guide rails;
a second tonneau cover provided at the rear end of the first tonneau cover, a rear end portion of the second tonneau cover being coupled to the back door, the second tonneau cover having a rollable type of sheet member; and
a slide drive mechanism operative to move substantially vertically the rear end of the first tonneau cover and a front end of the second tonneau cover along the guide rails.

2. The tonneau cover device of a vehicle of claim 1, wherein said first tonneau cover is comprised of a board member.

3. The tonneau cover device of a vehicle of claim 1, wherein the sheet member of said second tonneau cover has a side cut-away portion that is operative to prevent interference with a periphery of the vehicle-body opening portion formed at the vehicle-body rear face when the back door is open.

4. The tonneau cover device of a vehicle of claim 1, wherein the sheet member of said second tonneau cover has a transparent portion.

5. The tonneau cover device of a vehicle of claim 2, wherein said first tonneau cover is comprised of a plurality of board members that are disposed in a vehicle longitudinal direction, and the first tonneau cover is configured to bend between adjacent board members at a vertical movement thereof along the guide rails.

6. The tonneau cover device of a vehicle of claim 5, wherein there is provided a guide means to cause a specified bending between the adjacent board members.

7. The tonneau cover device of a vehicle of claim 5, wherein bending between the adjacent board members is a reverse-V-shaped bending.

8. The tonneau cover device of a vehicle of claim 7, wherein at a side face of the baggage compartment is provided a guide means operative to cause the reverse-V-shape bending between the adjacent board members.

9. The tonneau cover device of a vehicle of claim 8, wherein said guide means comprises a support portion to support the adjacent board members in the reverse-V-shaped bending state.

10. The tonneau cover device of a vehicle of claim 7, wherein the rear end of said first tonneau cover is supported at the guide rails at a position that is below a plan extending line of a front board member of the adjacent board members.

11. The tonneau cover device of a vehicle of claim 5, wherein at least one board member is provided in front of the adjacent board members.

12. The tonneau cover device of a vehicle of claim 11, wherein rear-side adjacent board members are configured to bend in a first direction and front-side adjacent board members are configured to bend in a second direction when the board members move vertically along the guide rails.

13. The tonneau cover device of a vehicle of claim 12, wherein at least one board member is further provided in front of the three board members.

14. The tonneau cover device of a vehicle of claim 1, wherein said first and second tonneau covers are provided detachably at a vehicle body.

15. The tonneau cover device of a vehicle of claim 14, wherein a foremost board member of said first tonneau cover has a fixing portion to the vehicle body.

16. The tonneau cover device of a vehicle of claim 1, wherein said first and second tonneau covers are configured to be foldable.

17. The tonneau cover device of a vehicle of claim 1, wherein said first tonneau cover is comprised of a rollable type of sheet member.

18. The tonneau cover device of a vehicle of claim 1, wherein said slide drive mechanism is configured to move vertically the rear end of the first tonneau cover and the front end of the second tonneau cover according to an opening-closing movement of the back door.

19. The tonneau cover device of a vehicle of claim 18, wherein said slide drive mechanism comprises a wire member, one end of which is fixed to the back door and the other end of which is fixed to the rear end of the first tonneau cover.

20. The tonneau cover device of a vehicle of claim 1, wherein said slide drive mechanism comprises an electromotive mechanism.

21. A tonneau cover device of a vehicle, which is provided so as to extend substantially horizontally above a baggage-compartment floor at a vehicle-body rear portion that is equipped with a back door to open and close a vehicle-body opening portion formed at a vehicle-body rear face and the baggage-compartment floor disposed in front of the vehicle-body opening portion, comprising:
   a pair of guide rails provided at both-side walls of a baggage compartment so as to extend obliquely relative to a vertical direction;
   a first tonneau cover provided so as to extend substantially horizontally above the baggage-compartment floor, a rear end of the first tonneau cover being supported at the guide rails;
   a second tonneau cover provided at the rear end of the first tonneau cover, a rear end portion of the second tonneau cover being coupled to the back door, the second tonneau cover having a rollable type of sheet member; and
   a slide drive mechanism operative to move substantially vertically the rear end of the first tonneau cover and a front end of the second tonneau cover along the guide rails,
   wherein said first tonneau cover is comprised of a board member, and the sheet member of said second tonneau cover has a side cut-away portion that is operative to prevent interference with a periphery of the vehicle-body opening portion formed at the vehicle-body rear face when the back door is open.

22. A tonneau cover device of a vehicle, which is provided so as to extend substantially horizontally above a baggage-compartment floor at a vehicle-body rear portion that is equipped with a back door to open and close a vehicle-body opening portion formed at a vehicle-body rear face and the baggage-compartment floor disposed in front of the vehicle-body opening portion, comprising:
   a pair of guide rails provided at both-side walls of a baggage compartment so as to extend obliquely relative to a vertical direction;
   a first tonneau cover provided so as to extend substantially horizontally above the baggage-compartment floor, a rear end of the first tonneau cover being supported at the guide rails;
   a second tonneau cover provided at the rear end of the first tonneau cover, a rear end portion of the second tonneau cover being coupled to the back door, the second tonneau cover having a rollable type of sheet member; and
   a slide drive mechanism operative to move substantially vertically the rear end of the first tonneau cover and a front end of the second tonneau cover along the guide rails,
   wherein said first tonneau cover is comprised of a board member, and the sheet member of said second tonneau cover has a transparent portion.

* * * * *